US012229381B2

(12) United States Patent
Vegesna

(10) Patent No.: US 12,229,381 B2
(45) Date of Patent: Feb. 18, 2025

(54) PRESENTING ENTITY ACTIVITIES

(71) Applicant: Zoho Corporation Private Limited, Chengalpattu Taluk (IN)

(72) Inventor: Ramakrishna Raju Vegesna, Austin, TX (US)

(73) Assignee: Zoho Corporation Private Limited, Chengalpattu Taluk (IN)

( * ) Notice: Subject to any disclaimer, the term of this patent is extended or adjusted under 35 U.S.C. 154(b) by 0 days.

(21) Appl. No.: 18/117,811

(22) Filed: Mar. 6, 2023

(65) Prior Publication Data

US 2023/0325045 A1 Oct. 12, 2023

Related U.S. Application Data

(60) Provisional application No. 63/341,310, filed on May 12, 2022.

(30) Foreign Application Priority Data

Mar. 18, 2022 (IN) .............................. 202241014993

(51) Int. Cl.
*G06F 3/0481* (2022.01)
*G06F 9/451* (2018.01)

(52) U.S. Cl.
CPC ............ *G06F 3/0481* (2013.01); *G06F 9/451* (2018.02)

(58) Field of Classification Search
CPC ................................ G06F 3/0481; G06F 9/451
See application file for complete search history.

(56) References Cited

U.S. PATENT DOCUMENTS

| | | | | |
|---|---|---|---|---|
| 2003/0200254 | A1* | 10/2003 | Wei | H04L 67/04 709/203 |
| 2007/0101272 | A1* | 5/2007 | Nomura | G06F 9/5038 709/229 |
| 2010/0125791 | A1* | 5/2010 | Katis | H04M 3/42221 715/716 |
| 2011/0055756 | A1* | 3/2011 | Chen | G06F 3/0482 715/810 |

(Continued)

*Primary Examiner* — Daniel W Parcher
(74) *Attorney, Agent, or Firm* — Ahmann Kloke LLP

(57) ABSTRACT

An entity-centric approach has been proposed to provide a consistent user experience in accessing a unified software applications suite effortlessly. Entities are connected with one another. The entities and the connectivity between them are reflected in all three functional layers of 3-tier client-server architecture. Every entity has a set of attributes and each attribute represents a data item or record of a particular type. The data items or records are represented in the form of card(s) as determined by contextualization and access control engines. The connection between two or more entities in the context of communication/interaction, collaboration and productivity, can be referred to as an activity. The activities of the entities can be represented in a timeline or swimlane mode. The timeline mode represents the recent activities between two entities as a vertical timeline chart, in reverse chronological order. The swimlane mode represents activities of multiple entities, in parallel. A timeline chart is dedicated to each entity in its corresponding lane. With a date-lock option in swimlane mode, the timeline chart in each lane is locked for a particular date or time period.

21 Claims, 29 Drawing Sheets

(56) References Cited

U.S. PATENT DOCUMENTS

| | | | |
|---|---|---|---|
| 2011/0055768 A1* | 3/2011 | Chen | G06F 3/0481 |
| | | | 715/841 |
| 2011/0055771 A1* | 3/2011 | Chen | G06F 16/954 |
| | | | 715/854 |
| 2016/0202950 A1* | 7/2016 | Hawley | G08G 5/0052 |
| | | | 700/94 |
| 2017/0235739 A1* | 8/2017 | Yang | G06F 3/0481 |
| | | | 715/781 |
| 2017/0329614 A1* | 11/2017 | Schon | G06F 3/0481 |
| 2018/0253195 A1* | 9/2018 | Van Osten | G06F 3/04847 |
| 2019/0391825 A1* | 12/2019 | Jann | G06F 3/0482 |
| 2022/0365980 A1* | 11/2022 | Tyagi | G06F 16/9035 |
| 2023/0177103 A1* | 6/2023 | Yamada | G06F 40/177 |
| | | | 715/234 |

* cited by examiner

500

| UI Layer 502 | UI Process Component 508 | Customization Module 512 |
| | | UI Level ID Generator 514 |
| | | Design Element Creator 516 |
| | UI Components 510 | |
| Process Layer 504 | Contextual Module 518 | |
| | Access Control Module 520 | |
| | Logic Module 522 | |
| Data Layer 506 | Data Access Components 524 | |
| | Data Access Platform 526 | |

FIG. 5

Jun 30
4:00 PM

✏️ ✂️ [Done]

Closed the deal. Received the purchase order. There is an upsell opportunity. Needs further followup in Q4.

I set the talk to follow up in Q4. Customer has some wish lists. We should try to address them.

Created couple of lists and added their wish lists.

Sarah Dawson

← 2300

⊕ New Note

| | |
|---|---|
| Jun 30 | Closed the deal. Received the purchase order. There is an upsell opportunity. Needs further followup in Q4.     Sarah Dawson |
| May 15 | Peter evaluated our products. Seemed impressed - will f/up.     Sarah Dawson |
| Apr 11 | Followed up with John. He assigned Peter to the project. Received Peter's contact info and scheduled a call with him.     Sarah Dawson |
| Feb 05 | Talked to John. He is going to assign a person to evaluate the software in May.     Sarah Dawson |

PRESENTING ENTITY ACTIVITIES

CROSS-REFERENCE TO RELATED APPLICATIONS

The present application claims priority to Indian Provisional Patent Application No. 202241014993, entitled "METHODS AND SYSTEMS TO PRESENT ENTITY ACTIVITIES IN ENTITY-CENTRIC UNIFIED BUSINESS MODEL," and filed on Mar. 18, 2022, and claims priority to U.S. Provisional Patent Application No. 63/341,310, entitled, "METHODS AND SYSTEMS TO PRESENT ENTITY ACTIVITIES IN ENTITY-CENTRIC UNIFIED BUSINESS MODEL," filed on May 12, 2022, which is incorporated herein by reference in its entirety.

BACKGROUND

A software application bundle can be a set of software applications for common productivity tasks. These software application bundles are application-centric or application-oriented. Each software application in the bundle may have a distinct User Interface (UI). This becomes painful as the user has to access multiple applications. The user may face an inconsistency when accessing one or more application from the bundle.

SUMMARY

Making use of an entity-centric paradigm that includes entity "nodes" connected to one another via relationship "edges" in an organizational graph addresses problems with app-centric approaches. A user, who is also represented as an entity in the organization graph, can readily navigate the organizational graph in accordance with their own relationships with target entities and the target entities' relationships with one another. Applications are moved to the background and are exposed in accordance with relevant context.

BRIEF DESCRIPTION OF THE DRAWINGS

FIG. 5 is a diagram of functional layers and components of an example of a unified software suite.

FIG. 23 illustrates an example of an expanded view of notes in a timeline chart.

FIG. 28 depicts an example of a side bar rendered over an entity details screen.

DETAILED DESCRIPTION

A unified software suite is a patchwork/bundle/collection of cloud applications, legacy tools, and other applications bundled together to transform an organization's disparate activities into a more connected and agile organization, thereby increasing productivity across the organization, delivering better customer experiences, and much more. It is apt to call it a "single operating system" for the organization. It acts as a powerful tool to pull data from various applications of the unified software suite and visualize them on a single screen thus providing valuable insights with respect to the organization. ZOHO ONE™ is an example of a system that bundles software applications like ZOHO Mail™, ZOHO CRM™, ZOHO Cliq®, ZOHO Books™, ZOHO Document™, etc.

A unified software suite functions poorly as a bundle of applications with an app-centric approach. Building a software application with an app-centric approach, is becoming complex as it not only monitors a set of hosts, it also has to monitor sources of data. In this paper, sources of data that are to be monitored are referred to as entities. A software application with "entity-centric" approach allows a user to connect to the data to understand increasingly complex and interdependent systems in the context of organizational operations. It's an improvement to "app-centric" in the unified software suite context because any complex modern software application has to deal with much more than just applications. Changing from the app-centric approach to an entity-centric approach is a solution. The unified software suite with an entity-centric approach provides a consistent user experience in accessing bundled software applications effortlessly.

An entity is used to model and manage data in a software application. Examples of entities for building such software application include accounts, contacts, employees, activities, etc. Every entity has a set of attributes and each attribute represents a data item or record of a particular type. For example, the "account" entity has attributes like name, address, etc. For instance, if an entity is implemented in a database table, the entity attributes may correspond to table columns.

Figure 1:
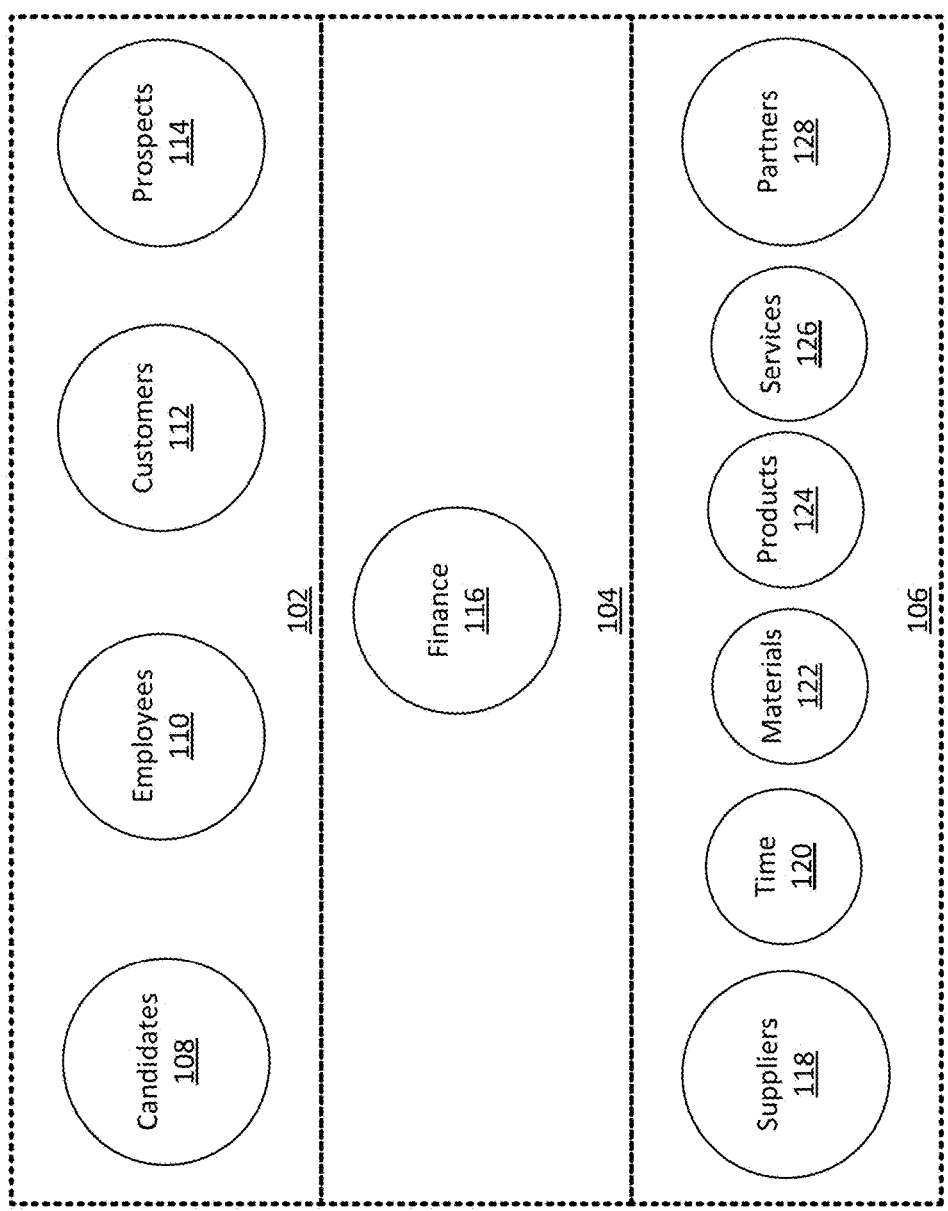
FIG. 1 is a diagram of essential entities for an example of a unified software suite.

FIG. 1 is a diagram 100 of essential entities for an example of a unified software suite. In this example, a consumer group 102 includes candidate entities 108, employee entities 110, customer entities 112, and prospect entities 114. The candidate entities 108 and prospect entities 114 feed into the employee entities 110 and customer entities 112. The deliverables group 106 includes supplier entities 118, time entities 120, material entities 122, product entities 124, service entities 126, and partner entities 128. Entities like the "prospects" and "customers" entities are consumers of "products" and "services" entities, which are offered/created using entities like "time" and "materials". The entities "products" and "services" are supplied through the "suppliers" entities, and sold through "partners" entities. The process is enabled by a finance entity 116 in a finance group 104. In a specific implementation, all these entities are reflected in an organizational graph by including a separate module for all these entities. Some of the entities, like "employees", "customers", "finance", "time", "materials", "products", and "services" are closely linked within an organization; the other entities are outside. In the example of FIG. 1, the "finance" entity is in the middle, but the central entity could be "customer" or some other entity selected by an administrator or user in accordance with their preferences or requirements.

Figure 2:
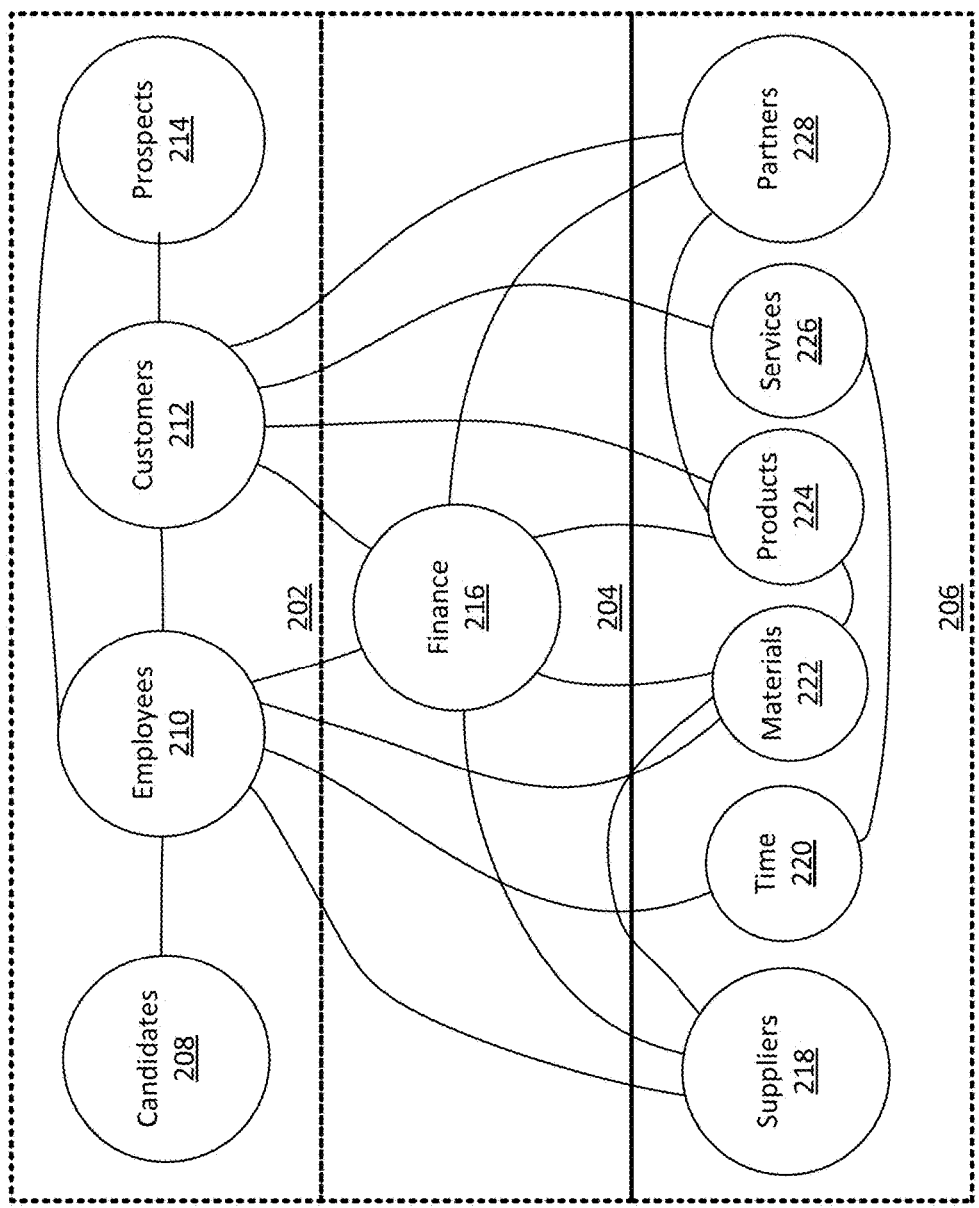
FIG. 2 is a diagram of connections between entities of an example of a unified software suite.

FIG. 2 is a diagram 200 of connections between entities of an example of a unified software suite. The groups 202, 204, and 206 are equivalent to the groups 102, 104, 106. The entities 208-228 are equivalent to the entities 108-128. In a specific implementation, every entity is connected to all other entities in an organizational graph, either directly or indirectly.

Figure 3:
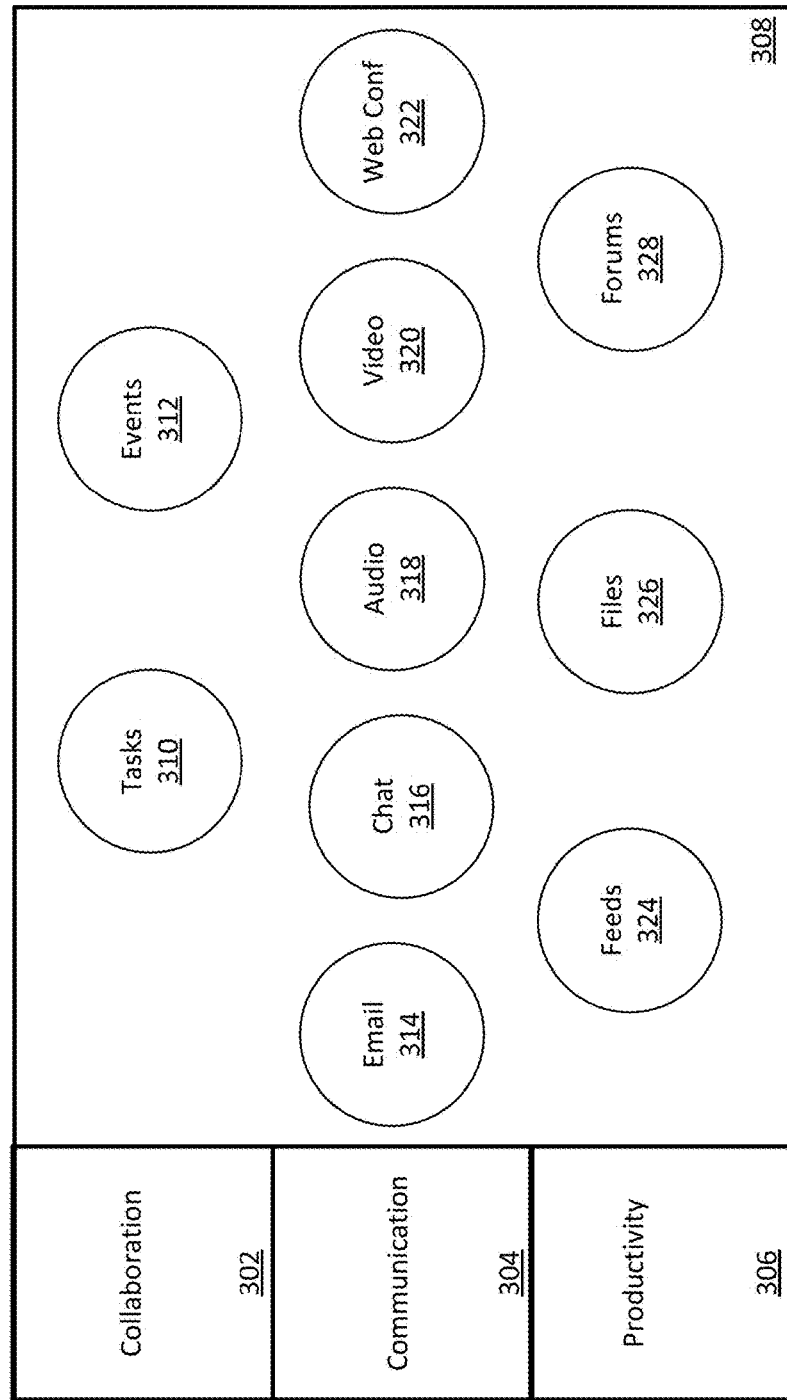
FIG. 3 is a diagram of examples of software applications of a unified software suite.

FIG. 3 is a diagram 300 of examples of software applications of a unified software suite. Several software applications could be deployed to realize the connection among entities of the unified software suite. These software applications broadly fall under three different contexts collaboration 302, communication 304, and productivity 306. Examples of software applications with communication context include email 314, chat 316, audio 318 (e.g., voice calls, audio recordings, meetings, and music, to name three examples), video 320 (e.g., video calls, video recordings, and graphical animations, to name three examples), web conference 322 (or, more generally, a meeting scheduled via a calendar application or for which the unified software suite has otherwise been notified, with or without a transcript, recording, or video recording of the meeting), etc. Examples of software applications with collaboration context include tasks 310, events 312, and workdrive-related applications, such as Customer Relationship Management (CRM), finance-books, projects, calendar, etc. Examples of software applications with productivity context includes feeds 324, files 326, and forums 328.

Software applications with communication context enable connection between or integration among entities through conversation, mail, chat, web meetings, etc. Communication is among one or more entities like "employees", "customers", "prospects", "suppliers", "partners" and "candidates".

The communication among the entities is about one or more entities like "time", "material", "products", "service", and "finance". For instance, a communication between an "employee" entity and a "supplier" entity could be a conversation related to delayed payments to a "supplier". The conversation should include "finance" details in context. This uniquely enables bringing context to almost every conversation. Advantageously, understanding inter-connections can facilitate pre-enabling connections.

Figure 4:
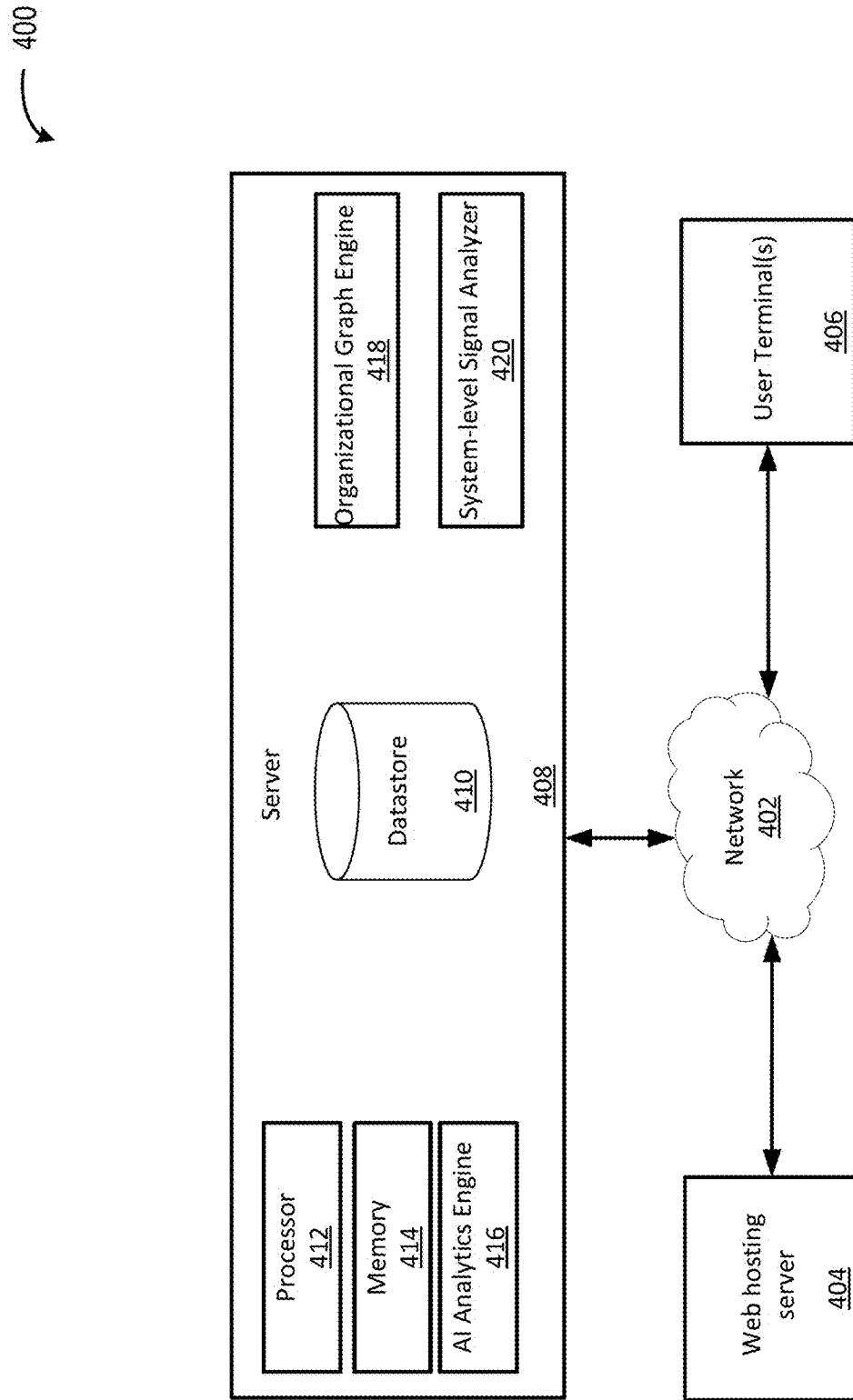
FIG. 4 is a block diagram of an example of an entity card utilization system.

FIG. 4 is a block diagram 400 of an example of an entity card utilization system. In this example, the system comprises an application server 408 connected to one or more user terminals 406 through the network 402 (e.g., the Internet) and a web hosting server 404 to host a unified software suite on the Internet.

The application server includes an Artificial Intelligence (AI) analytics engine 416, system-level signal analyzer 420, organizational graph engine 418, a processor 412, memory 414, and a datastore 410.

The system-level signal analyzer observes and collects signals (e.g. notifications like message, mail, payment, etc.) across the unified software suite, and stores them in the datastore.

Entities and connections between them are stored in the form of nodes and relationships respectively in an organizational graph in an organizational graph datastore. The organizational graph datastore is present in the data storage and, in this example, is flexible, dynamic, and easy to integrate into the unified software suite.

In a specific implementation, an organizational graph is created including a set of nodes that are connected or related to each other. Each node in the organizational graph represents an entity (e.g., a record or a data item belonging to an entity). Each node comprises a label or a tag to define the role of the entity in the organization. A relationship between two nodes refers to a connection (through software applications of any context namely communication, collaboration or productivity) between the two entities. Each relationship has a direction and name and is connected to two nodes. Each node can have a relationship type and a set of relationships with another node. In a specific implementation, relationships are always directed, but they can be navigated efficiently in any direction.

When an entity connects with one or more entities through a software application in any context, the same is captured by the organizational graph. The organizational graph engine receives navigation context or user query. It navigates through the organizational graph to search for the required data corresponding to the navigation context or user query. It retrieves the required records or data items belonging to one or more entities along with the relationship between them, from the organizational graph. In a specific implementation, these records are displayed to a human agent of an entity, who can be referred to as a "user."

The AI analytics engine hooks to the data in the data storage and provides valuable insights in the form of trend graphs, score values, etc. The AI analytic engine provides live insights into the data.

The network 402 is intended to represent a network of computer systems. A "computer system," as used herein, may include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller. As used in this paper, a means for computing, initiating, or stopping (in a computer system context) includes a processor of some kind, and is intended to include a hardware processor executing instructions, if applicable.

Memory of a computer system includes, by way of example but not limitation, random access memory (RAM), such as dynamic RAM (DRAM) and static RAM (SRAM). The memory can be local, remote, or distributed. Non-volatile storage is often a magnetic floppy or hard disk, a magnetic-optical disk, an optical disk, a read-only memory (ROM), such as a CD-ROM, erasable programmable read-only memory (EPROM), or electrically erasable programmable read only memory (EEPROM), a magnetic or optical card, or another form of storage for large amounts of data. During execution of software, some of this data is often written, by a direct memory access process, into memory by way of a bus coupled to non-volatile storage. Non-volatile storage can be local, remote, or distributed, but is optional because systems can be created with all applicable data available in memory.

Software in a computer system is typically stored in non-volatile storage. Indeed, for large programs, it may not even be possible to store the entire program in memory. For software to run, if necessary, it is moved to a computer system location appropriate for processing, and for illustrative purposes in this paper, that location is referred to as memory. Even when software is moved to memory for execution, a processor will typically make use of hardware registers to store values associated with the software, and a local cache that, ideally, serves to speed up execution. As used herein, a software program is assumed to be stored at an applicable known or convenient location (from non-volatile storage to hardware registers) when the software program is referred to as "implemented in a computer system location." A processor is considered "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus of a computer system can couple a processor to an interface. Interfaces facilitate the coupling of devices and computer systems. Interfaces can be for input and/or output (I/O) devices, modems, or networks. I/O devices can include, by way of example but not limitation, a keyboard, a mouse or other pointing device, disk drives, printers, a scanner, and other I/O devices, including a display device. Display devices can include, by way of example but not limitation, a cathode ray tube (CRT), liquid crystal display (LCD), or some other applicable known or convenient display device. Modems can include, by way of example but not limitation, an analog modem, an integrated services digital network (ISDN) modem, a cable modem, and other modems. Network interfaces can include, by way of example but not limitation, a token ring interface, a satellite transmission interface (e.g., "direct PC"), or other network interface for coupling a first computer system to a second computer system. An interface can be considered part of a device or computer system. As used in this paper, a means for sending, requesting, providing, or receiving includes an interface of some kind (potentially including a user interface).

Computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. For example, with reference to FIG. 5, the contextual module can be implemented as a contextualization engine, the access control module can be implemented as an access control engine, and the logic module can be implemented as a logic engine; the UI layer and data layer can also include engines, such as a UI processing engine, a customization engine, a UI level ID generation engine, a design element creation engine, or a data access engine (or the engines of the process layer can utilize datastores therefrom). As used in this paper, an engine includes at least two components: 1) a dedicated or shared processor or a portion thereof; 2) hardware, firmware, and/or software modules executed by the processor. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized, or its functionality distributed. An engine can include hardware, firmware, or software embodied in a computer system for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

The network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

A LAN is a private network that connects devices within a limited area like a residence, an office, a building or a campus. A wired LAN uses Ethernet cables to connect computers together directly or more commonly, through a hub, switch, or router. Wireless networks use radio waves to connect devices such as laptops to the Internet and other hand held devices.

FIG. 5 is a diagram 500 functional layers and components of an example of a unified software suite. A 3-tier client-server architecture is used by way of example to build the unified software suite. In this example, there are three logical layers, a User Interface (UI) layer 502, a process layer 504, and a data layer 506. The data layer handles and stores data (if required), the process layer handles logic, and the UI layer controls a Graphical UI (GUI) that can be used to communicate with the other two layers. To offer unified experience, the connectivity or integration among entities should be reflected in all three layers.

Data items of the attributes in the entities are displayed on UI with a basic design element called a "card". There are several other types of design elements like list, popover, side-bar, etc. that can be used to display the data items. Popover can be actionable in scenarios in which, for example, they include provisions with a set of graphical elements, e.g., action buttons, to complete a task. Hence, the user can experience a uniform design and has no need to switch between the tabs of different software applications with different user interfaces. One or more data items are mapped to a corresponding design element that is itself mapped to a UI display mode based on the context and permission level determined by the contextualization engine and access control engine. Hence every data item has several different identities (IDs) in each functional layer of the unified software suite. Table 1 lists various IDs that are used in a specific implementation to display a data item from the data layer onto the UI layer to provide a seamless visual experience to the user.

TABLE 1

IDs for a data item in data layer and the UI layer

| Name | Description |
| --- | --- |
| UI level ID | The unique ID of the mode of the design element as viewed by the user. The examples of several modes of the design element say card refers to the height of the card, width of the card, etc. |
| Design level ID | The unique ID of the design element like card, list, popover, etc. Each design element has its ID created in the UI layer. Examples of design level ID include card ID, list ID, etc. |
| Data level ID | The unique ID of the data items of the attributes of every entity. It is generated when the data item is created for the first time. Even the information regarding the relationship between the attributes are also considered to be an entity. Thus they could also have a unique data level ID. |

There are several components which collectively represent the three layers of the unified software suite. Some of these components may exist on the user terminal, some on the server, or some combination thereof.

The data access platform 526 of the data layer 506 is an abstraction layer encapsulating the data access components 524 and functionality.

The data access component integrates access to different data sources. This component also coordinates data manipulation. In a specific implementation, in the event a storage offering shall be replaced or the interface of a storage offering changes, the data access component is the only component that has to be adjusted.

The logic module 522 of the process layer 504, which can be implemented as a logic engine, accepts user requests, processes them, and determines the routes through which the data will be accessed.

The access control module 520 of the process layer 504, which can be implemented as an access control engine, determines access permissions of users. In a specific implementation, the engine determines a data item or record a user can create, read, update, and/or delete (CRUD). The access permission depends on the following factors:

i) Hierarchy level of the user in the organization;
ii) Time zone or location of the user; and/or
iii) Privacy related Permissions: An entity can choose who can access the personal information provided by them to the organization.

The contextual module 518 of the process layer 504, which can be implemented as a contextualization engine, determines the origin of a user or finds an answer to the question "Where is the user from?" and builds context dynamically. In a specific implementation, the contextualization engine builds context which is a compound aggregate of the following sub-contexts:

i) Time zone or geographical location context of the user: Determining the current location of the user to analyze the place or time zone, from where the user is requesting access. For example, Consider two users user 1 and user 2 from different time zones. Then the cards could be displayed in day mode or night mode, based on the time zone of the user. Similarly, time zone plays a crucial role in representing dates (DD/MM/YYYY, YYYY/MM/DD), time format (12 hours, 24 hours) etc.

ii) Navigation pattern of the user: Determining the context of the activity cards based on the navigation pattern of the user. As an example, consider a user viewing interactions of a company entity "Zenn Inc." The user can navigate to the activity screen of an employee entity from the activity screen of the company entity Zenn Inc. A list of activity cards related to the selected employee entity will now be displayed to the user. This difference is due to the change in the navigation context. The navigation could also be from an entity for example an application used for communication purposes. Assume a scenario when a user is communicating or chatting with a customer using a software application for communication. Now the communication itself becomes a context to the customer and the customer becomes a context to the communication.

iii) Personalized or preferential context: Determining the customizations required by user according to his/her personal preferences (due to age factor, a disability like color blindness, etc.) like font size, color themes, etc. For a user with a disability like color blindness, the UI level ID of the cards will be different when compared to the UI level ID of the cards displayed for a normal user without any disability.

iv) Privacy related context: Accessing details of each entity based on a static permission set by the entity itself. The static permissions set by the entity are stored in a data storage. For example an entity say employee can decide on what personal information he/she can provide to the organization. If the organization entity does not have a static permission and still tries to access the personal information of the employee, then the employee is immediately notified about this to seek his/her permission in real time. Usually data protection regulations like GDPR mandate these kind of privacy preservation policies for customers. The proposed unified software suite not only offers such benefits to customer entity alone. It is possible to preserve the privacy of any persona-based entities like employees, contacts, etc.

Based on access permission and context determined by the access control engine and contextualization engine, data items to be mapped to design elements are filtered from the organizational graph. The design elements are mapped to the corresponding UI level ID as determined by the contextualization engine and access control engine. The UI level ID generator 514 of the UI layer 502 generates the UI level IDs and the design element creator 516 of the UI layer 502 creates design element instances.

The UI components 510 of the UI layer 502 are various design elements present on the UI. Because users have often become familiar with the way these design elements work, consistent and predictable choices become desirable, which leads to smooth task completion, efficiency, and satisfaction of the users. User interactions on the UI are synchronized and organized by the UI process components 508, when implemented as UI process component engines. This enables the same basic user interaction patterns to be reused by multiple user interfaces. The customization module 512, when implemented as a customization engine, customizes the visual appearance of the design elements by user request.

Design elements include cards, lists, popovers, side bars, input controls, informational components, navigational components, containers, etc.

Design element creator aids in the process of creating the design elements like cards, lists, pop over, etc. In a specific implementation, there exists a separate module for creating each type of design element. For instance, a card creator is involved in creating cards, a list creator is involved in creating lists, and a pop over creator is involved in creating pop overs. Similarly, other such creators are involved in creating other types of design elements.

Figure 6:
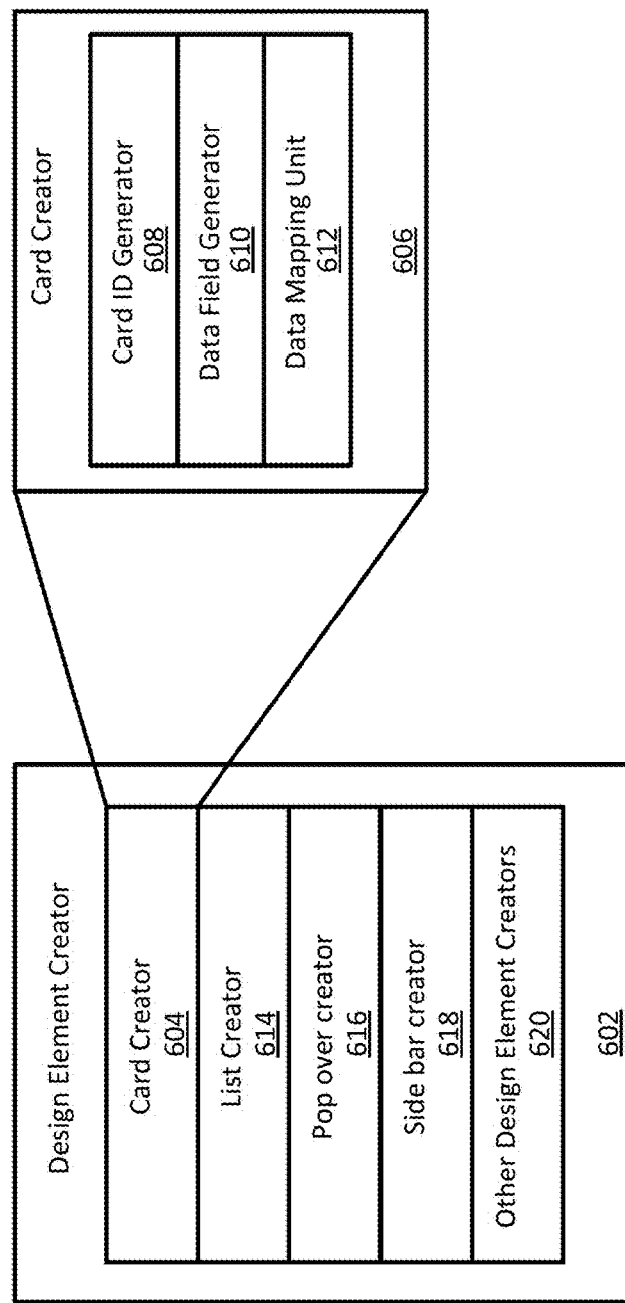
FIG. 6 is a diagram of an example of a design element creator.

FIG. 6 is a diagram 600 an example of a design element creator. In the diagram 600, a design element creator 602 includes a card creator 604, a list creator 614, a popover creator 616, a sidebar creator 618, and other design element creators 620. The card creator 604 of the design element creator 602 creates and customizes card designs. A "card" is an UI design pattern that groups related information or data items of one or more entities in a flexible-size container that, at least in a specific implementation, visually resembles a playing card, hence the name. Despite its origin, the term "card" is intended to include modular shapes that do not resemble playing cards. The card is used to create modular UI patterns as it works well across a variety of screens and window sizes. In a specific implementation, cards have the following properties: Cards are used for grouping information; cards present a summary and link to additional details; and cards allow for flexible layouts.

In the example of FIG. 6, the card creator 604 is blown up for more detail as card creator 606. The card creator 606 includes a card ID generator 608, a data field generator 610, and a data mapping unit 612. The card ID generator generates a unique ID for every card, called Card ID which is actually a type of design level ID. In a specific implementation, the data field generator is a drag and drop interface enabling users/designers to drag and drop database fields (or custom computed fields) on to the card design to represent the data item. On top of dragging a field to a card, the data mapping unit maps data level ID of required data items from the data storage to corresponding database fields. The mapping process associates the data items and cards based on context (as determined by the contextualization engine) and access permissions (as determined by the access control engine). Database fields are just one type of element represented on a card. Other elements could be text, tags, images, etc. Data represented on a card can come from custom applications or third-party applications/sources.

Each card can have multiple display designs or visual patterns (modes, size, filter, etc.). The UI level ID generator generates UI level ID for each design of the card. A single card ID can be mapped with multiple UI level IDs. A card can be displayed in different UI designs and even with different contents. The visual pattern can differ in each case. Every visual pattern has a unique UI level ID. This means that a single card ID can be mapped to multiple UI level IDs. UI level ID is picked based on the context and access permission determined by the contextualization engine and access control engine. It can also be customized based on user requirements.

Figure 7:
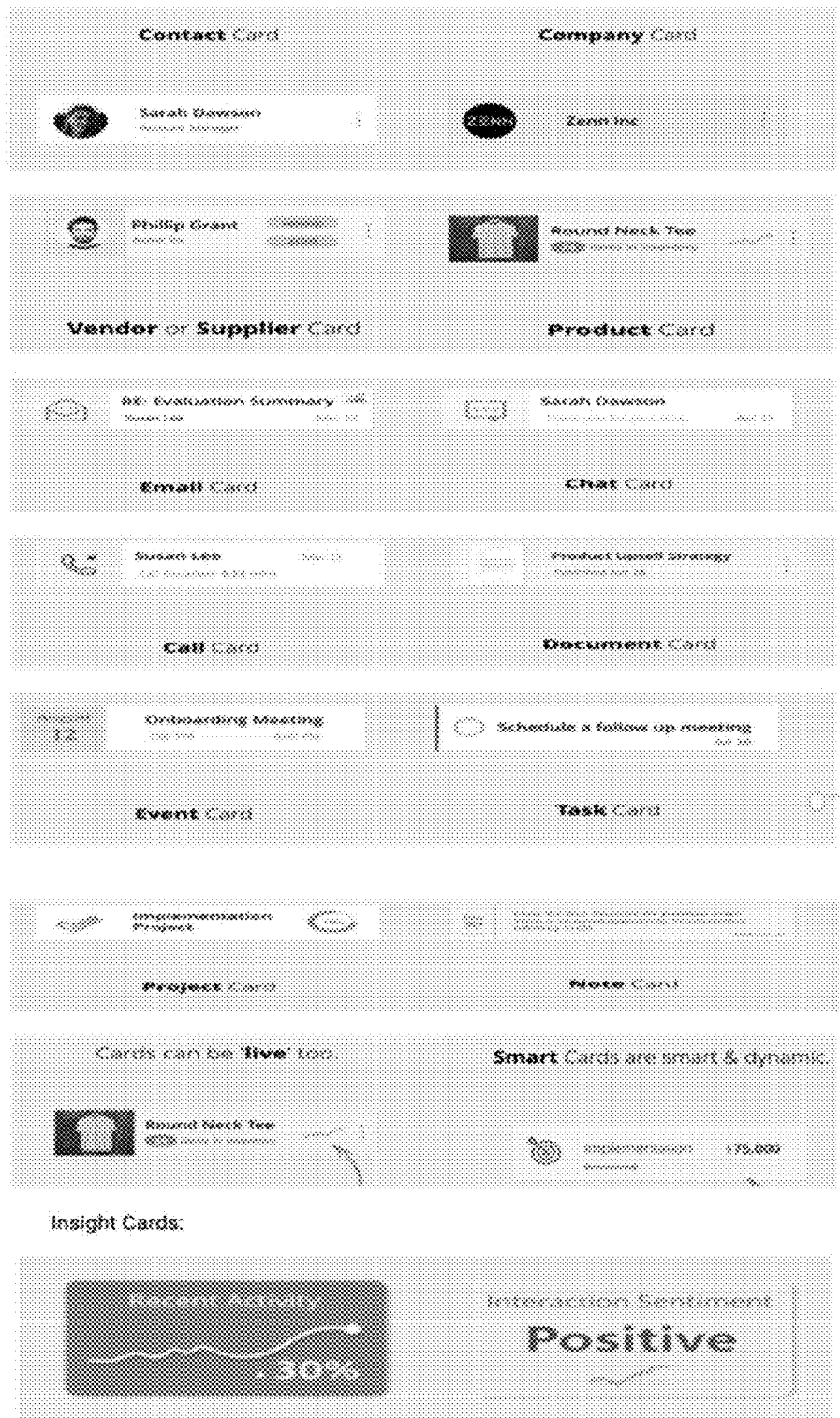
FIG. 7 includes screenshots of examples of different types of cards.

FIG. 7 includes screenshots 700 examples of different types of cards. Based on the relationship of the entities, cards can be broadly classified into three categories, collaboration card, communication card or interaction card, and productivity card. Collaboration card is further classified into task card, event card, activity card, etc. Communication card or interaction card is further classified into email card, chat card, audio call card, video call card, meeting card, etc. Productivity card is further classified into feed card, file card, forum card, etc. Based on the type of entity, the cards can also be classified into contact cards (contact card of an employee, company, customer, supplier, vendor, etc.), product card, etc. The cards can be smart cards, live insight cards, and snapshot cards. The contents of these cards are highly dynamic corresponding to the trend analytics of the data items mapped to it.

Figure 8:
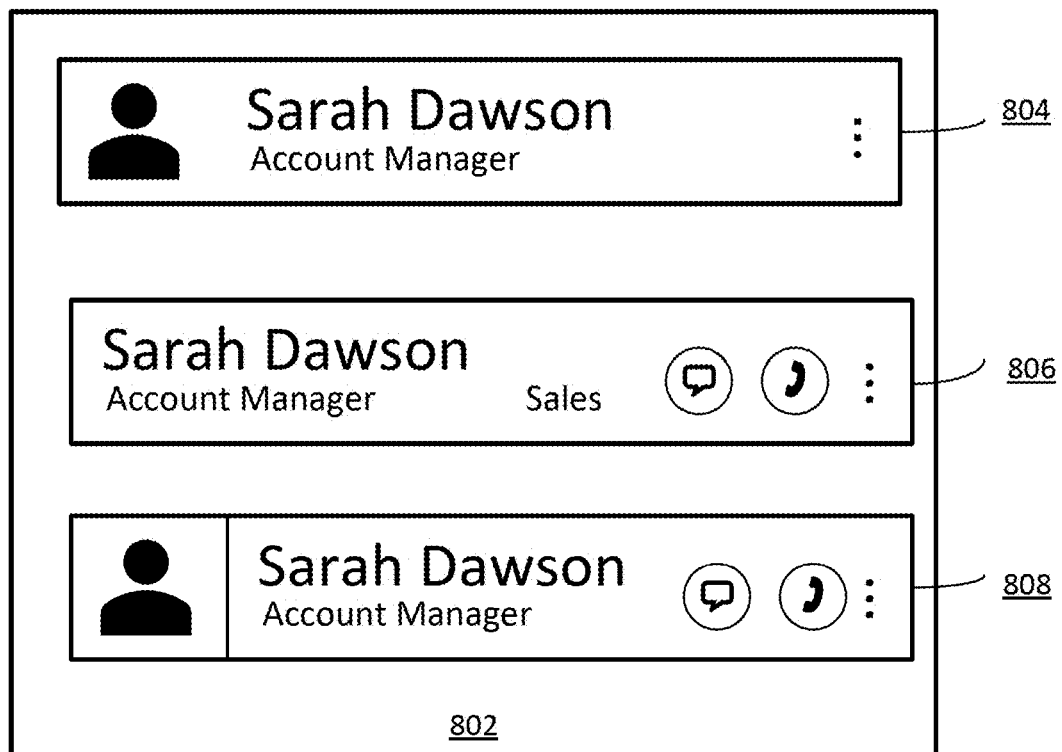
FIG. 8 includes conceptual illustrations of multiple designs of a card for an "employee" entity.
Figure 9:
FIG. 9 is a diagram of day mode and night mode variations of a card for an "employee" entity.
Figure 10:
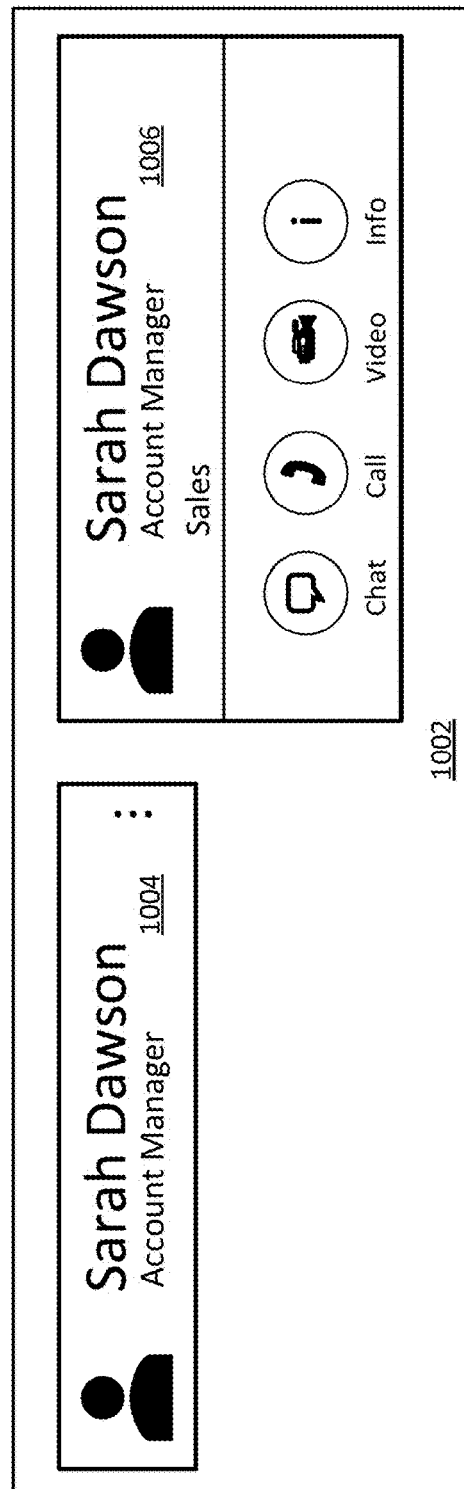
FIG. 10 is a conceptual diagram of a card of an "employee" entity with different heights (single and double).

FIG. 8 includes conceptual illustrations 802 of multiple designs 804, 806, 808, of a card for an "employee" entity. A card can be displayed in different modes i.e. day mode and night mode. FIG. 9 is a diagram 900 of day mode and night mode variations of a card for an "employee" entity. A card can also be displayed in different heights i.e. single height and double height. FIG. 10 is a conceptual diagram 1000 of a card of an "employee" entity with different heights (single and double).

An entity details screen displays a summary of a selected entity when a user clicks on one of the entity cards from, e.g., an entity list. If each card takes the user to a respective software application that owns the data, they will be treated with a different user experience for each entity. Advantageously, software applications can be pushed behind to focus on the entities and offer a consistent UI for every entity to provide a uniform experience.

Figure 11:
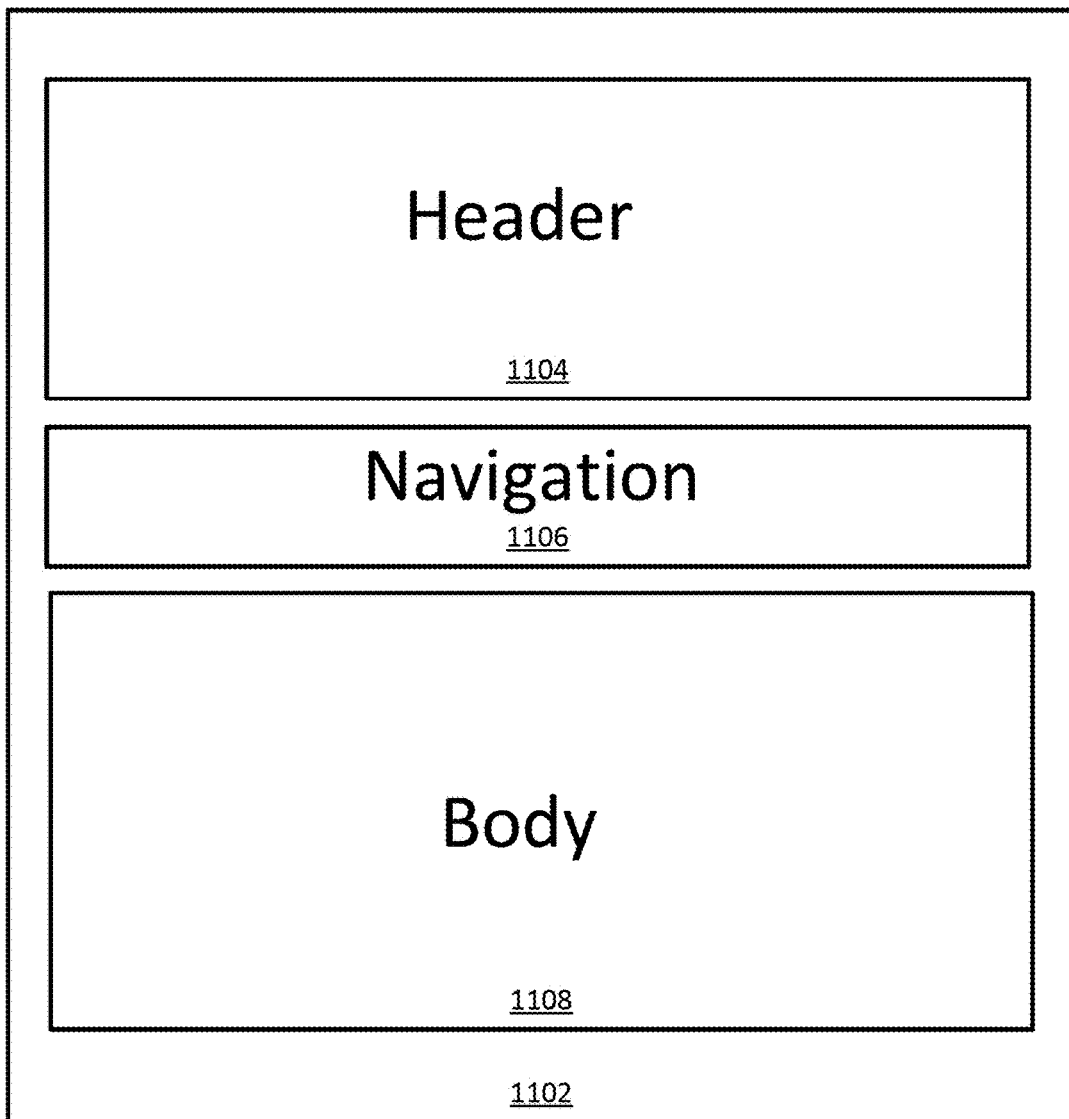
FIG. 11 is a block diagram of a layout of an example of an entity details screen.

FIG. 11 is a block diagram 1100 of a layout of an example of an entity details screen. The entity details screen for each entity is different and can be dependent on relationships, context, and access rights/permissions of the user. In this example, an entity details screen 1102 is split into header 1104, navigation bar 1106, and body 1108.

The header of the entity details screen indicates common information about the entity which is accessible by all. It includes entity logo and address, tags, snapshot cards, and live insight cards. A couple of entities, "customers" and "employees", have been picked to illustrate entity details. For this example, customers will have two sub-entities in the Business-to-Business (B2B) context, namely "company" and "contact(s)." The entity details screens for Company, Contact & Employees have been used to illustrate the concept.

Figure 12:
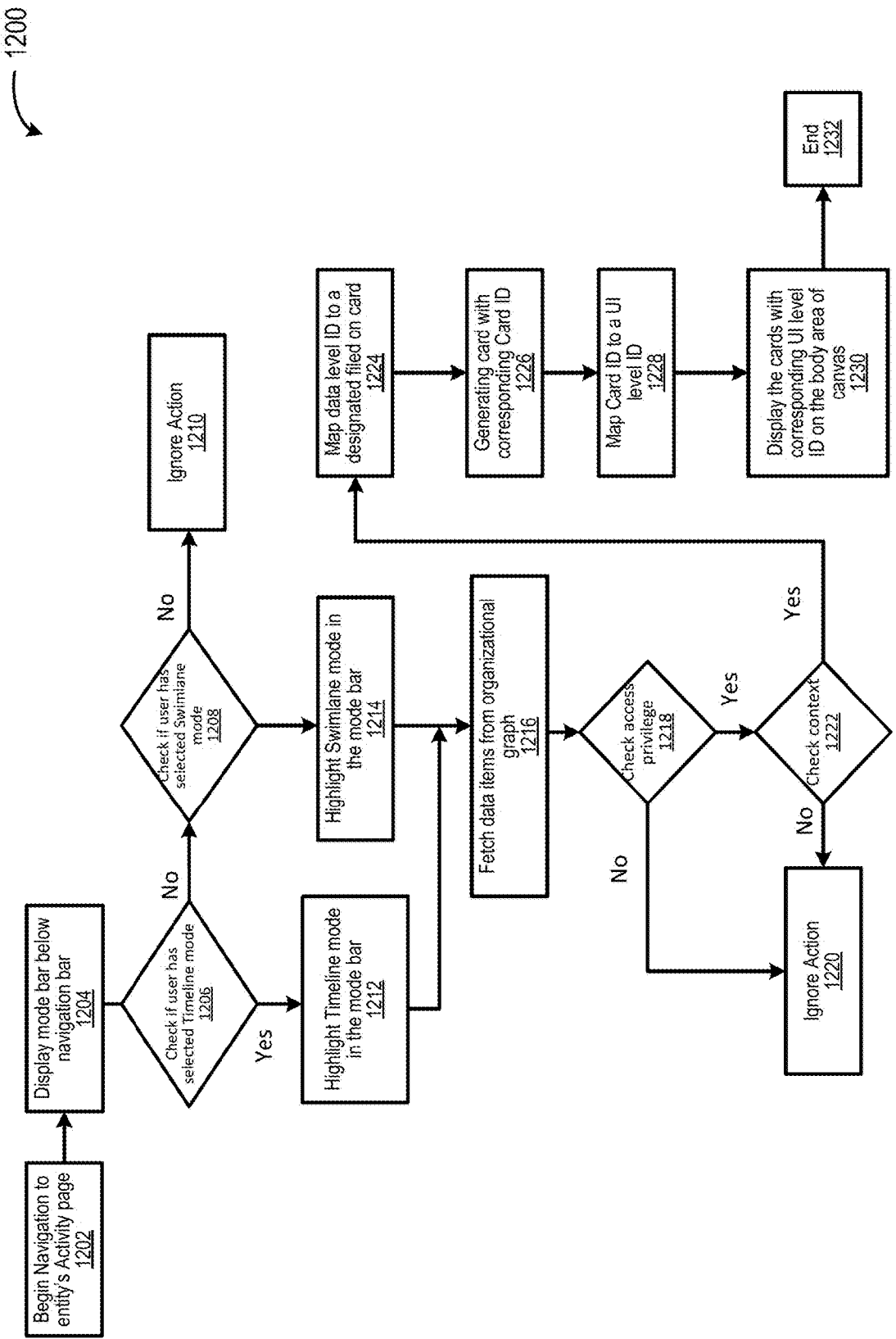
FIG. 12 depicts a flowchart of an example of a method for displaying an activity screen for a human agent of an entity in the organizational chart.

FIG. 12 depicts a flowchart 1200 of an example of a method for displaying an activity screen for a human agent of an entity in the organizational chart. In this example, when a human agent (user) of an entity represented in an organizational chart selects an activity tab from a navigation bar on the entity details screen, the activity screen for an entity is provided to the user through a UI interface 1202. A mode bar is located below the navigation bar on the activity screen to visualize activities in two ways, timeline mode and swimlane mode 1204. At decision point 1206, it is determined whether user has selected timeline mode. At decision point 1208, it is determined whether user has selected swimlane mode. If both decisions are no, the action is ignored for the purposes of this example 1210. The user can select a mode as desired to view an activity. If the user selects timeline mode (1206—Yes), it is highlighted on the mode bar 1212, and if the user selects swimlane mode (1206—No), that is highlighted on the mode bar 1214, and in either case, the flowchart 1200 continues to module 1216 with fetching data items from an organizational graph.

In a specific implementation, an activity instance is represented using a design element, e.g., a card. Each card can hold at least one data item. Each data item has a unique data level ID. A contextualization engine and an access control engine ensure data items, which can be mapped on the card representing an activity instance, are displayed in the body of the activity screen.

The access control engine determines the permissions of the user. In the flowchart 1200, this is depicted as decision point 1218, where it is determined whether the user has access privileges. (The flowchart ends at module 1220 if they do not.) A permissions subengine determines "What the user has access to?" or "Who is accessing the data?". This defines the permission level of the user to view data displayed on a screen. The engines thereby determine the data item or record for which an entity has access to enable a human agent of the entity to view them.

In a specific implementation, access permission depends on the following factors:
i) Hierarchy level of an entity in the organization.
ii) Time zone or location of a human agent of the entity.
iii) Privacy related Permissions: An agent of an entity can choose who can access the personal information provided by them to the organization.

If it is determined the user has access privileges (1218—Yes), then the flowchart continues to decision point 1222 where it is determined whether user has appropriate context. (If not, the flowchart ends at module 1220). The contextualization engine determines a location of the user or finds the answer to the question "Where is the user from?" and builds the context dynamically. The contextualization engine builds context which is a compound aggregate of the following sub-contexts:
i) Time zone or geographical location context of the human agent of an entity: Determining the current location of the user to analyze the place or time zone from where the user is requesting access.
ii) Navigation pattern of the entity: Determining previous pages or screens or entity details or lists.
iii) Personalized or preferential context: Determining customizations for a human agent according to personal preferences like font size, color themes, etc. or accessibility.
iv) Privacy related context: Accessing details of an entity based on the permission set by an agent of the entity itself. The contextualization engine and access control engine together decide what and how contents are to be displayed to the user.

Based on the access permission determination (Who is accessing the data?) and context (How they are accessing?), the data items to be mapped to the design elements, are filtered from the organizational graph. The data level ID of each data item or record of an activity instance is mapped into a design element called an activity card 1224. An activity card is created for each activity instance; each activity card has a unique card ID 1226. The card ID is mapped to a UI level ID corresponding to the determination of the contextualization engine and access control engine

1228. Finally, relevant activity cards are displayed on the body area of the activity screen, based on the mode selected by the user 1230 and the flowchart 1200 ends at module 1232. Card creator helps in capturing and displaying information in an information card.

Figure 13:
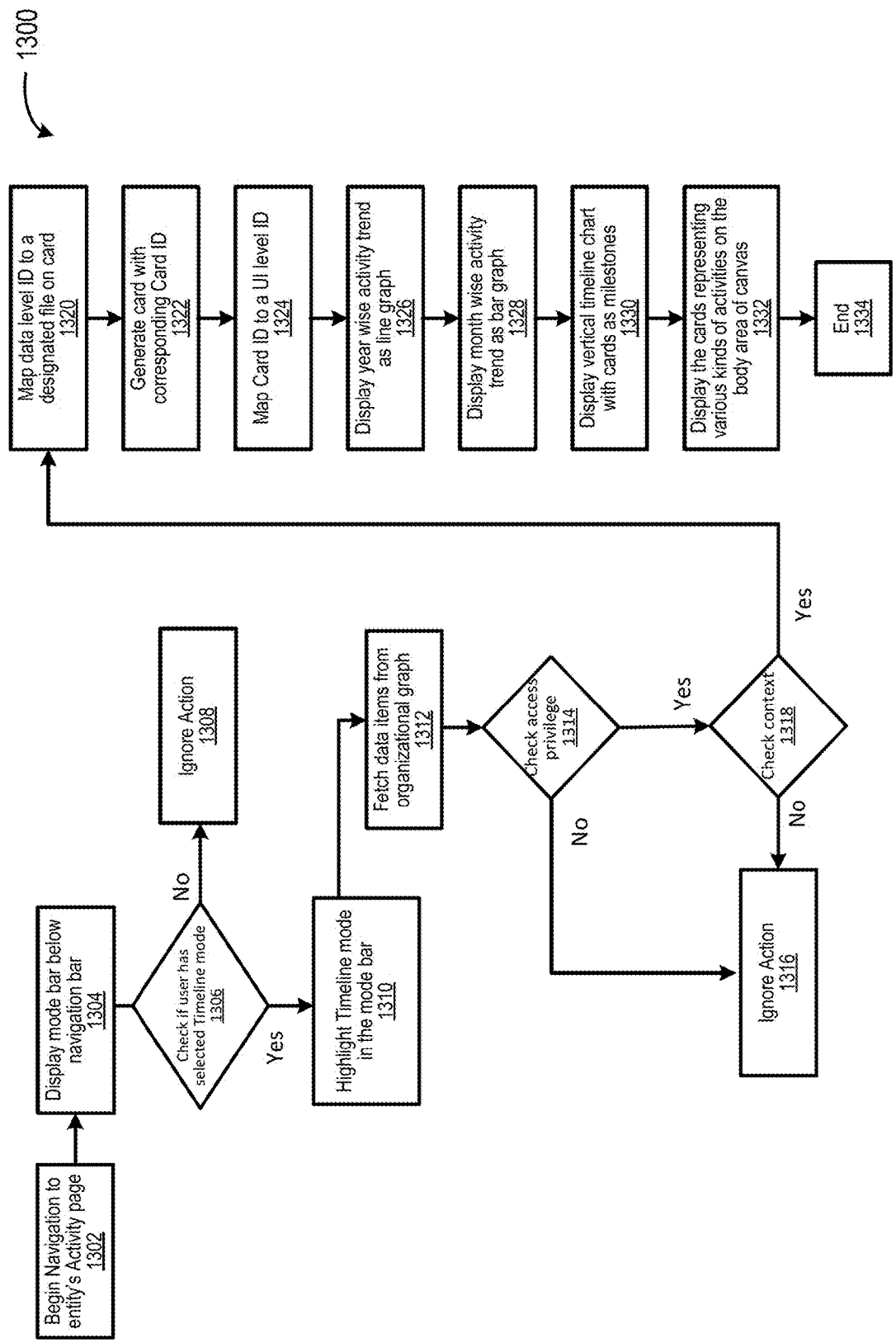
FIG. 13 depicts a flowchart of an example of a method for displaying activities in timeline mode.

FIG. 13 depicts a flowchart 1300 of an example of a method for displaying activities in timeline mode. The flowchart 1300 starts at module 1302 with begin navigation to entity's activity page (or screen), to module 1304 with display mode bar below navigation bar 1304, and to decision point 1306 with determining whether user has selected timeline mode. (If not, the flowchart 1300 ends at module 1308 for the purpose of this example.) If it is determined user has selected timeline mode (1306—Yes), the flowchart 1300 continues to module 1310 with highlight timeline mode in the mode bar and continues to module 1312 with fetching data items from organizational graph, decision point 1314 with determining access privileges, (assuming 1314—Yes) to decision point 1316 with determining appropriate context, (assuming 1316—Yes) to module 1320 with map data level ID to a designated file on card, to module 1322 with generate card with corresponding card ID, to module 1324 with map card ID to a UI level ID, to module 1326 with display year wise activity trend as line graph, and to module 1328 with displaying month wise activity trend as bar graph.

In a specific implementation, a line graph illustrating year-wise activity trend is located below a mode bar. The line graph can display an activity trend for a predetermined number of years or some other duration of time; for example, it could illustrate an activity trend for 5 consecutive years. The line graph has a selection window to enable a human agent of an entity (the user) to select a particular year to view the activities of any particular year. By default the current year is blocked by the selection window. The user can move the selection window to change the year as desired. In a specific implementation, a bar graph illustrating a month-wise activity trend is located below the mode bar (and below a year-wise line graph, if applicable). Through the bar graph, the user can drill down to visualize activities on a quarterly, monthly, or weekly basis, or for some other duration of time. The AI analytics engine (depicted in FIG. 4) plays a role in generating the bar graph and line graph.

A list of activities corresponding to a default time span or a time span selected by the user is displayed date-wise as a vertical timeline chart 1330. Cards representing various kinds of activities are displayed below the line graph in the timeline chart, on the body area of the activity screen 1332. Each activity card is connected to a central vertical line in the timeline chart. The activities are ordered in reverse chronological order. It can also be customized by user. If there are no activity instances for a default or selected time span, it is denoted with a dotted central vertical line in the timeline chart. The flowchart 1300 ends at module 1334.

Figure 14:
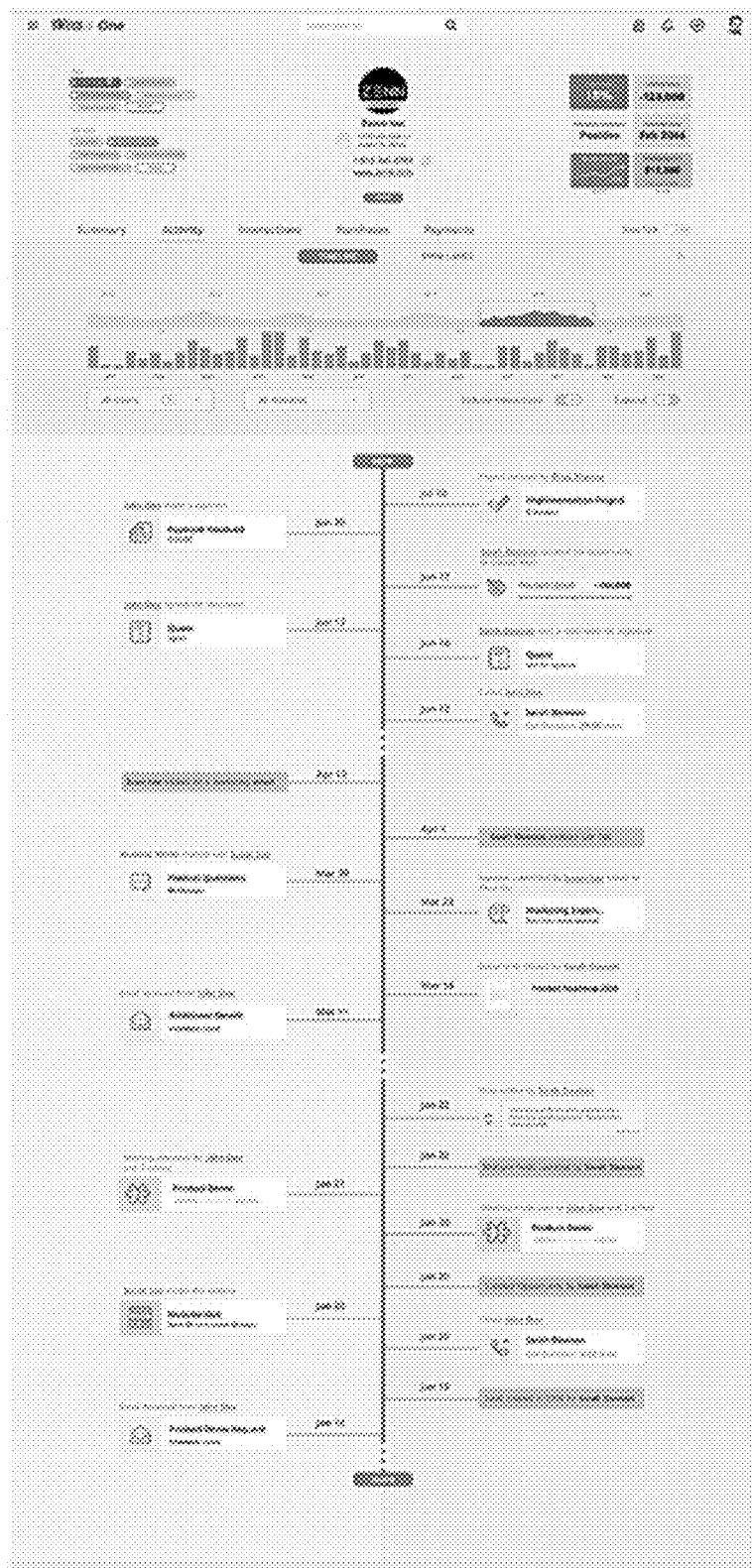
FIG. 14 shows a screenshot of activity of a "company" entity in timeline mode.

FIG. 14 shows a screenshot 1400 of the activity of the company entity in a timeline mode. Assume the company entity is connected with the customer entity and employee entity. The customer activities are arranged on one side and employee activity on the other side. Some of the employee-related activities are: Payment received, Document signed, Product related chat, Email received, Meetings attended, etc. Some of the customer-related activities are: Project initiation, Product up sell, Document signed, Call to employee, Expense submitted, Documents shared, Note added, Invite to meeting, etc.

Figure 15:
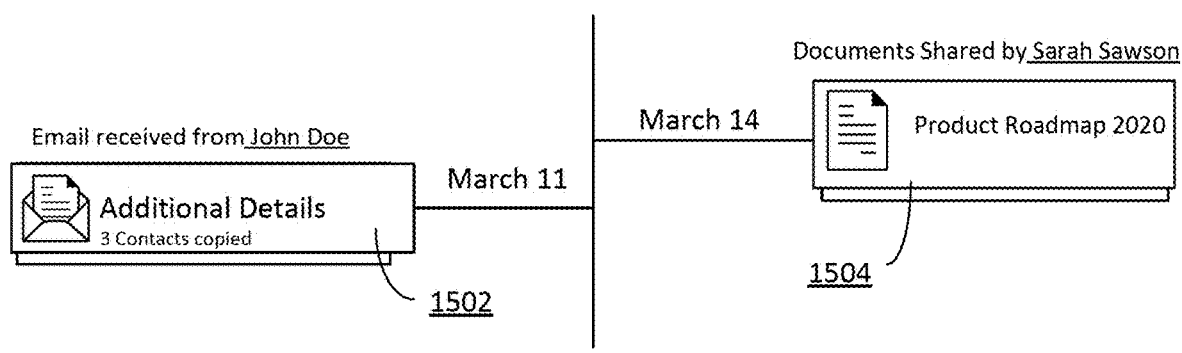
FIG. 15 is a diagram of an example of stackable cards for a timeline activity.

In a specific implementation, an agent of an entity may perform one or more similar activities for sharing multiple documents. (In this specific implementation, Document is an entity.) FIG. 15 is a diagram 1500 of an example of stackable cards for a timeline activity. In this example, a set of emails received from John Doe have been stacked on one another and displayed as collapsible cards 1502. Also in this example, a set of documents shared by an entity named "Sarah Dawson" have been stacked on one another and displayed as collapsible cards 1504. Activity cards are stacked on one another and displayed as collapsible cards. Upon mouse-over, all the cards in the stack would be made visible; the mouse-over is an example of an input stimulus.

In a specific implementation, an activity can be filtered by "All Users" and "All Activities." A user can select a team member entity from the dropdown menu to view the team member's activities in a timeline chart. Similarly, a dropdown menu of teams or departments appears when the user selects the All Activities filter. The user can select one or more team(s) or department(s)/team(s) from the dropdown menu to view their activities in a timeline chart. In another embodiment, the user can select one or more team(s) or department(s) from the dropdown menu and disable their activities from being displayed on the timeline chart. By default, the user can view all the activities across all the departments for which they have permission.

Figure 16:
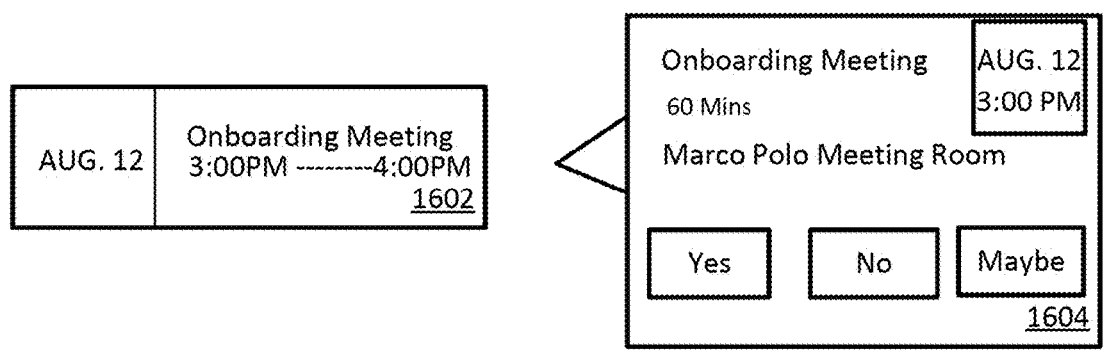
FIG. 16 shows an example of a notification for meeting with actionable popover.

In a specific implementation, a mouse-over action on an activity card displays a popover. A popover can be, for example, a detailed notification of an activity, such as a meeting. Popovers can also be actionable, as shown in FIG. 16. The Size and color of the popovers are customizable.

FIG. 16 is a diagram 1600 of an example of a notification for a meeting with actionable popover. An action card 1602 is for an onboarding meeting. The actionable popover 1604 lets a user accept a calendar invite for the onboarding meeting and this action is captured and stored by the organizational graph engine. The actionable popover may or may not provide additional information not shown in a card over which the popover is displayed, specifically, in this example, there is the additional information that the meeting will be in Marco Polo Meeting Room. It is reflected across the unified software suite. In a specific implementation, the actionable popover allows the user respond to a notification from the options provided by the popover. The actionable popover thus prevents the user from navigating to a specific application to respond to a notification.

Figure 17:
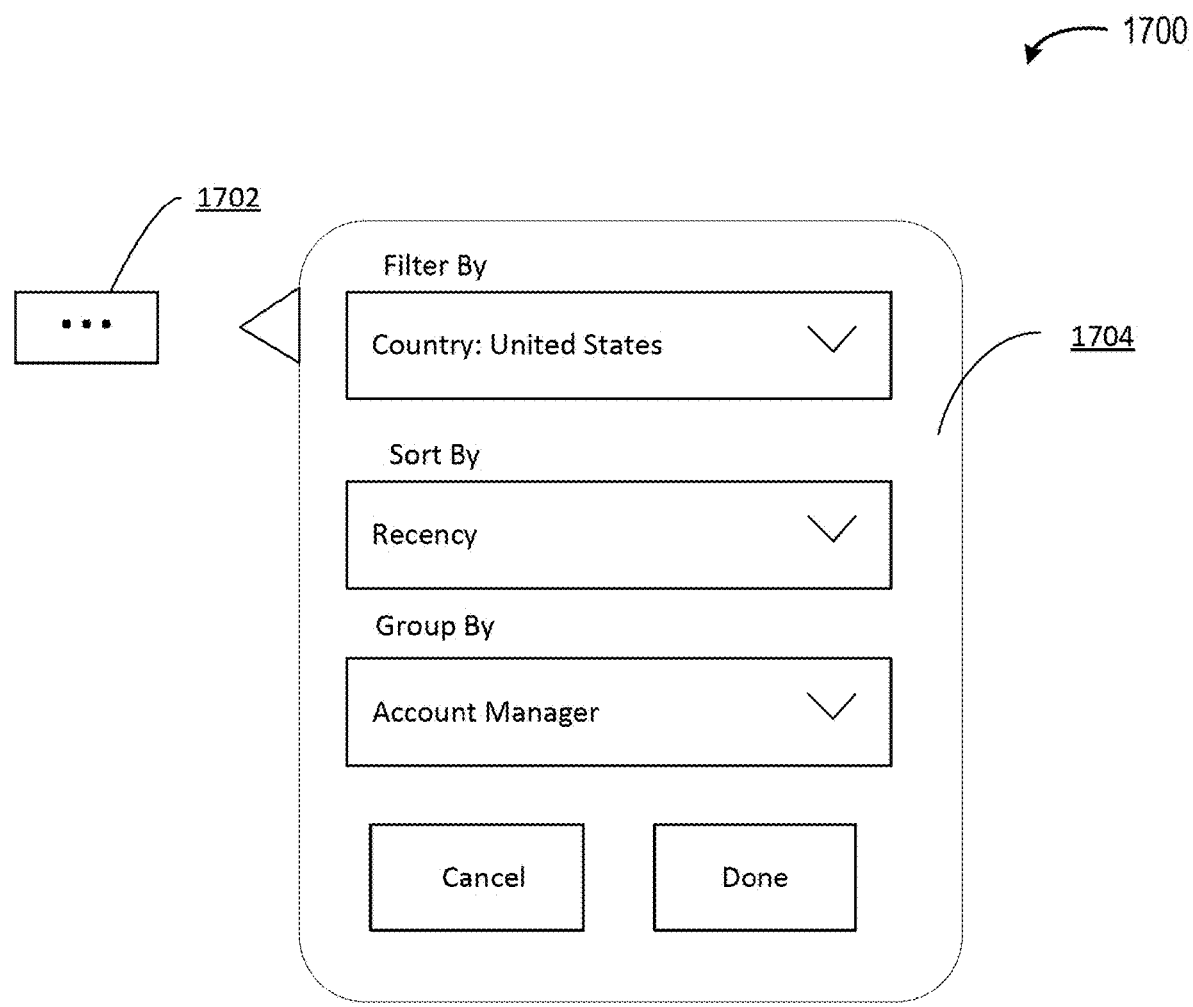
FIG. 17 shows an example of a popover by filter.

A popover 1704 from a card 1702 can pack additional options like Filter By, Sort By, and Group By and is shown in diagram 1700 of FIG. 17. Filter By, for instance, can be filtered by country. Sort By, for instance, can be sorted by recency. Group By, for instance, can be grouped by account manager.

In a specific implementation, expand option will use double-height cards to display additional information about the entity. The user can customize how the activity cards should appear in the timeline chart. The user can select expand mode to see activities as double-height cards. The timeline mode provides a simple visual overview of activities among entities from start to finish and leads to increased work efficiency among teams.

Figure 18:
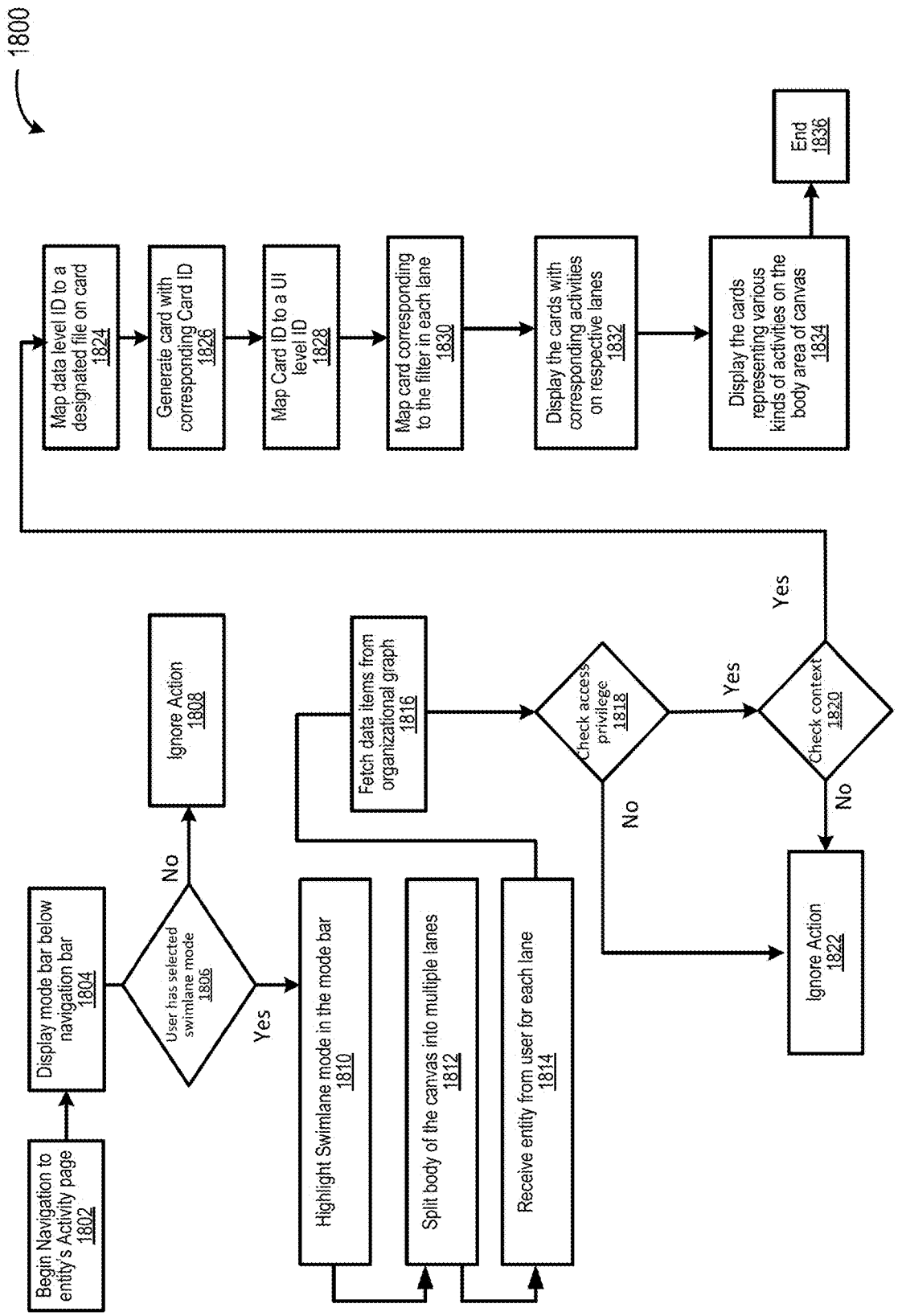
FIG. 18 is a flowchart of an example of a method for displaying activities in swimlane mode.

FIG. 18 is a flowchart 1800 of an example of a method for displaying activities in swimlane mode. Swimlane mode enables users to view various activities of selective entities in parallel. In this example, the activities of each entity selected by a user are displayed as a swimlane chart in a corresponding lane below the mode bar. Users can choose an entity for each lane through a dropdown menu. Each lane can be customized based on user preference.

The flowchart 1800 starts at module 1802 with begin navigation to entity's activity page and continues to module 1804 with display mode bar below navigation bar and to decision point 1806 with determining whether user has selected swimlane mode. (If it is determined swimlane mode has not been selected, the flowchart 1800 ends for the purpose of this example.) If it is determined user has selected swimlane mode (1806—Yes), then the flowchart 1800 continues to module 1810 with highlight swimlane mode in the mode bar, to module 1812 with split body of the canvas into multiple lanes, to module 1814 with receive entity from user for each lane, to module 1816 with fetch data items from organizational graph, to decision point 1818 with check access privilege, to decision point 1820 with check context, to module 18124 with map data level ID to a designated file on card, to module 1826 with generate card with corresponding card ID, to module 1828 with map card ID to a UI level ID, to module 1830 with map card corresponding to the filter in each lane, to module 1832 with display the cards with corresponding activities on respective lanes, to module 1834 with display the cards representing various kinds of activities on the body area of canvas; the flowchart 1800 ends at module 1836 (and can also end at module 1822 if 1818—No or 1818—No).

Figure 19:
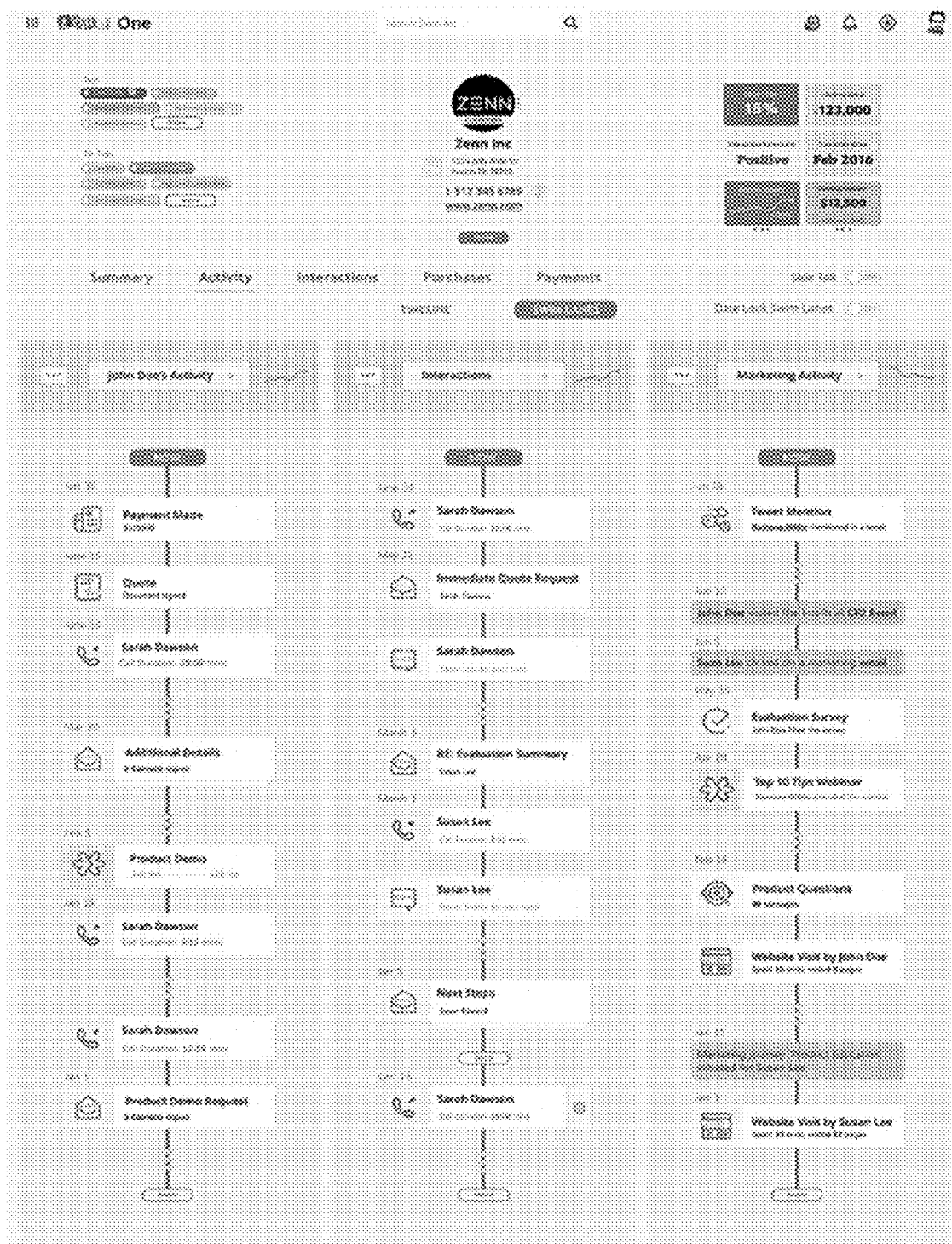
FIG. 19 is a screenshot of an example of swimlane mode.

FIG. 19 is a screenshot 1900 of an example of swimlane mode. The screenshot 1900 includes three lanes of visualization of activities of three different entities in parallel. The left-most lane shows the activities of a persona-based entity like employee, customer, etc. The right-most lane shows the activities of a department-based entity. The middle lane shows interaction activities.

In FIG. 19, the rightmost lane shows information cards. Information cards have a unique UI level ID that is different from that of the other cards. The entity's behavior such as visiting an event, accessing a file or folder or new software application are captured and displayed by the information card.

As an example, FIG. 19 is a screenshot of activities of a company entity, e.g., "Zenn Inc." Zenn Inc includes multiple contacts, e.g., "John Doe". The leftmost lane shows the activities of John Doe such as payment made, product demo request, etc. The middle lane shows the interactions among employee(s) and Zenn Inc, such as communication made via email, chats, calls, etc. The rightmost lane shows the space- or department-specific activities, such as marketing activities of the Zenn Inc entity. The marketing activities includes meetings, webinars, etc. The rightmost lane also displays information cards that capture persona-based entity behavior that is specific to the marketing space or department. In FIG. 19, an information card captures and displays that the entity John Doe visited the booth at a CIO event, which is an activity specific to marketing space or department in this example.

In a specific implementation, each lane comprises a timeline chart to represent the activity of the corresponding entity. In the example of FIG. 19, a list of activities is displayed date-wise as a vertical timeline chart in each lane. The timeline chart comprises a central vertical line. Activity cards are connected to a central vertical line of the timeline chart in each lane. The activities are ordered in a reverse chronological order, along with the day and month of the activity instance. If there are no activity instance for a particular period selected by the user, then the period is denoted with a dotted central vertical line of the timeline chart in each lane.

Figure 20:
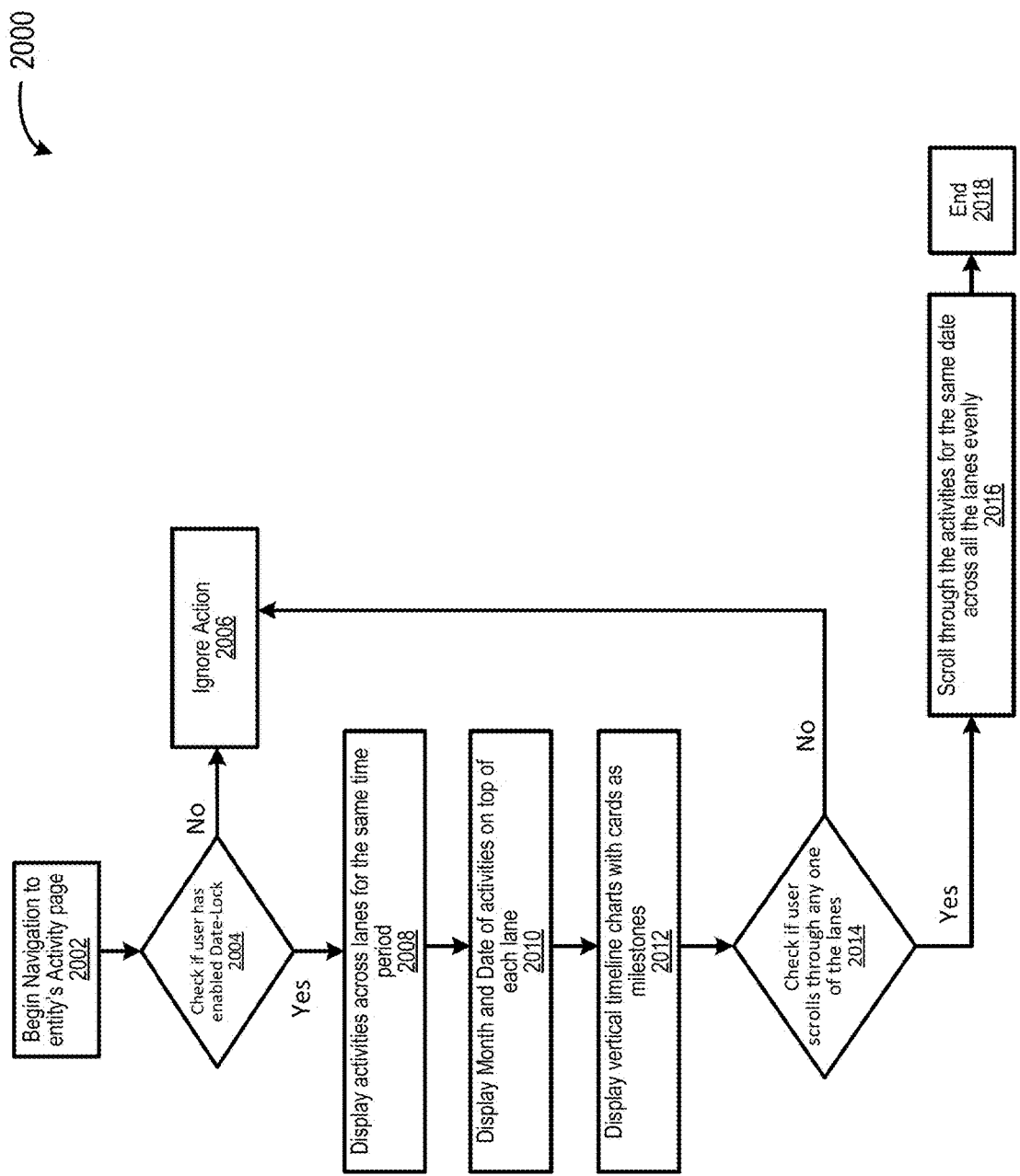
FIG. 20 is a flowchart of an example of a date-lock process option in swimlane mode.

FIG. 20 is a flowchart 2000 of an example of a date-lock process option in swimlane mode. In Swimlane mode, a date-lock can be enabled for parallel scrolling. By enabling the date-lock option, a user can view the activities of entities for a specific date or month or year. If the user scrolls up or down on a timeline chart of any lane, the timeline charts in other lanes also move corresponding to the scrolling direction input by the user, on anyone of the lanes. If the date-lock option is disabled, the dates of the activities in the timeline charts in each lane may not match with one another. If the user is viewing a particular day's activities in one lane, the other lanes may show different day's activities. The flowchart 2000 starts at module 2002 with begin navigation to entity's activity page (or screen), to decision point 2004 to check if user has enable date-lock (if 2004—No, the flowchart 2000 ends at module 2006 for the purpose of this example), to module 2008 with display activities across lanes for the same time period, to module 2010 with display month and date of activities on top of each lane, to module 2012 with display vertical timeline charts with cards as milestones, to decision point 2104 with check if user scrolls through any one of the lanes (if 2104—No, the flowchart 2000 ends at module 2006 for the purpose of this example), to module 2016 with scroll through the activities for the same date across all the lanes evenly, and to module 2018 where the flowchart 2000 ends.

Figure 21:
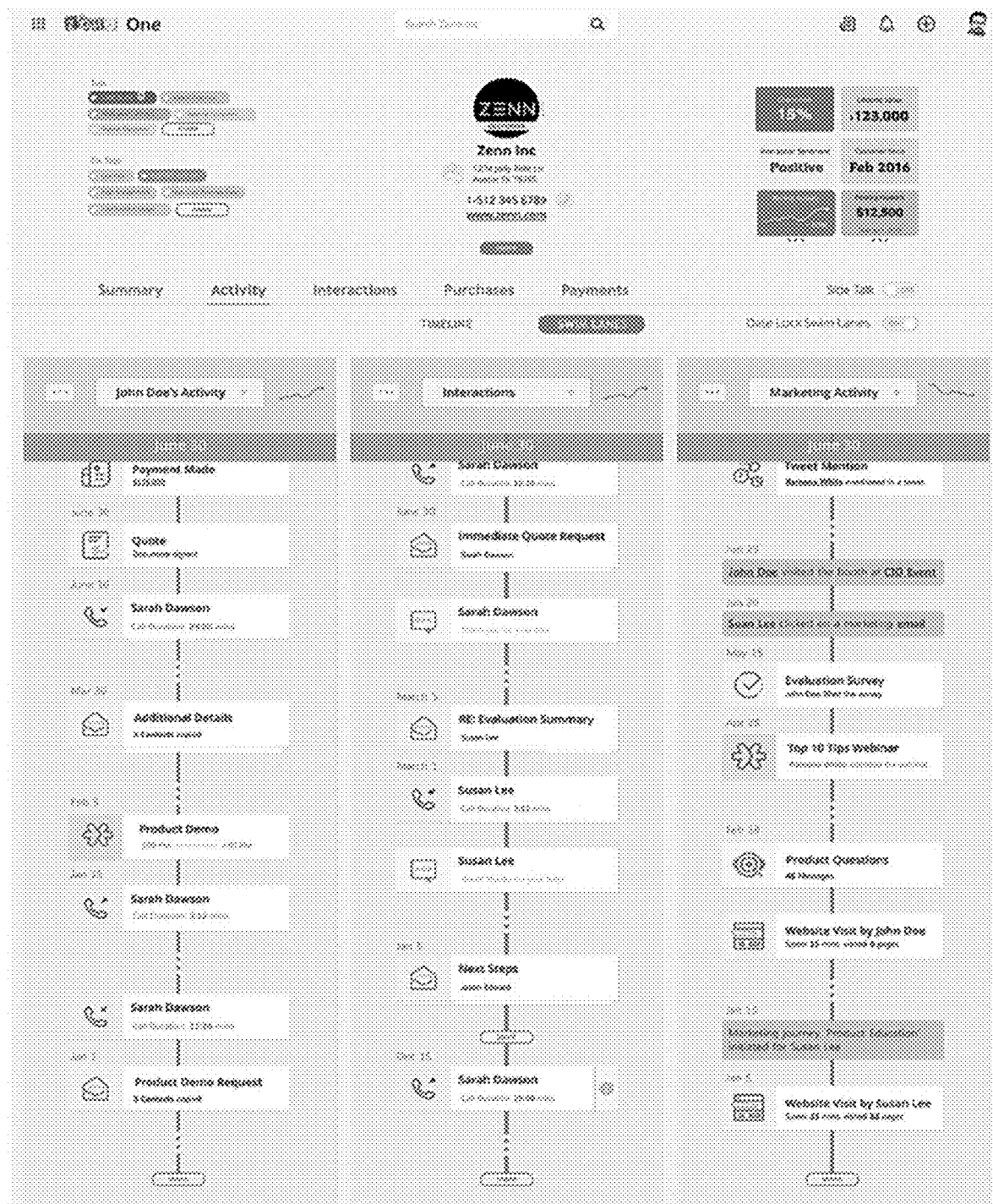
FIG. 21 shows a screenshot of a date-lock option in swimlane mode.

FIG. 21 shows a screenshot 2100 of a date-lock option in swimlane mode. The line graph in the top right corner of each lane in FIG. 19 and FIG. 21 shows a recent activity trend of an entity selected by the user, in each lane. The AI analytics engine (in FIG. 4) considers the recent trend of the activities entity-wise and generates the line graph accordingly.

Figure 22:
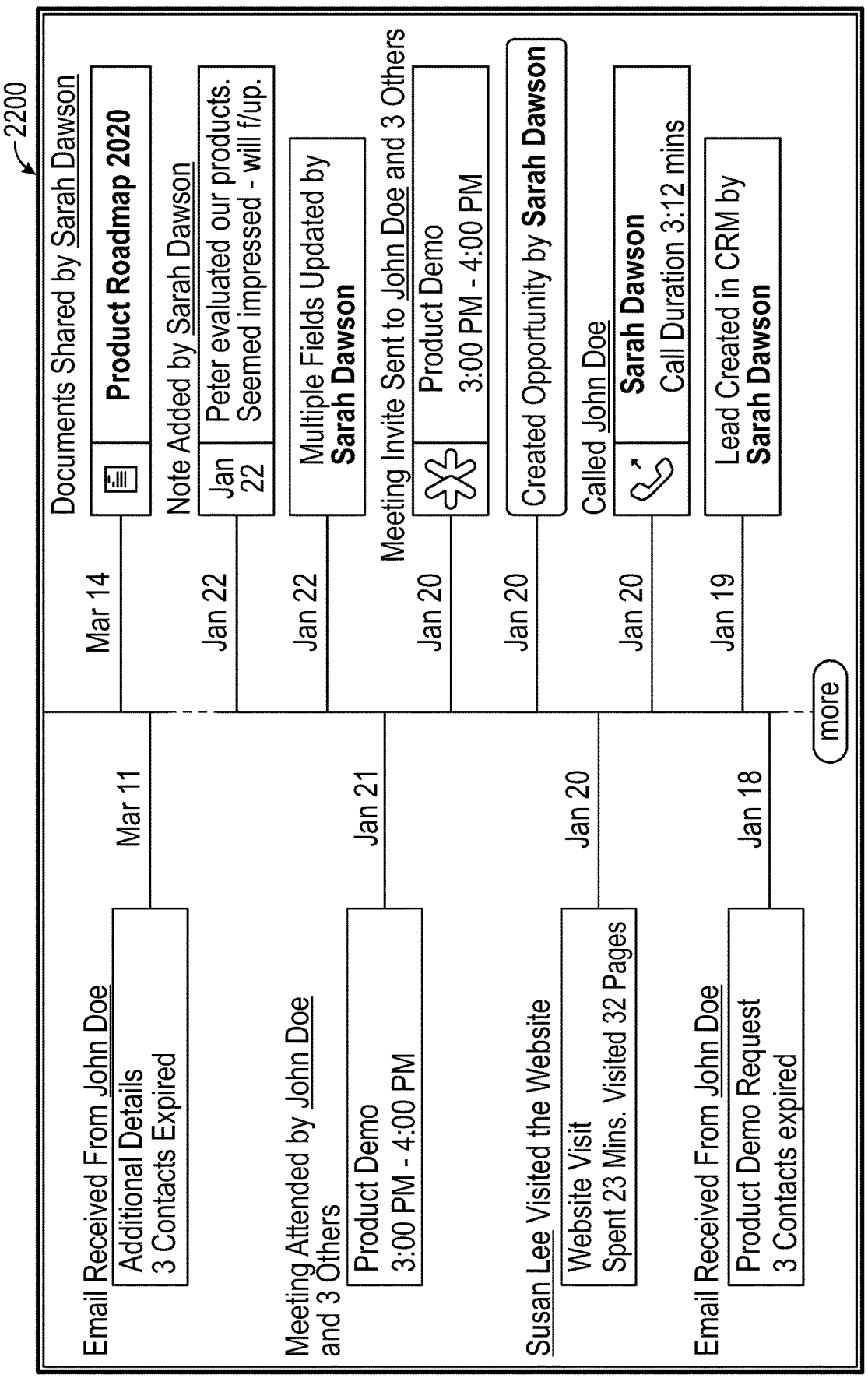
FIG. 22 depicts an example of an activity timeline chart showing notes.

FIG. 22 depicts an example of an activity timeline chart showing notes. In the example of FIG. 22, the activity screen displays notes taken by the user. In this example, the notes are stacked on one another and displayed as collapsible cards.

FIG. 23 illustrates an example of an expanded view of notes in a timeline chart. When the user selects a collapsible note card, the card is blown up into an expanded view as shown in FIG. 23. The user also has the option to add a new note, edit notes, save changes, or share notes through e-mail, chat, or some other communication channel.

For instance, Sarah Dawson, an account manager, creates notes and shares them with the sales team who are reporting under her. The sales team can only view the contents of the notes shared to them. Notes can be made collaborative by adjusting access privilege, such as by granting write access to an entity. In a specific implementation, access privilege changes according to the organizational hierarchy. For example, if Sarah Dawson reports to the director of accounts, the notes shared to the director of accounts may have collaborative access.

Figure 24:
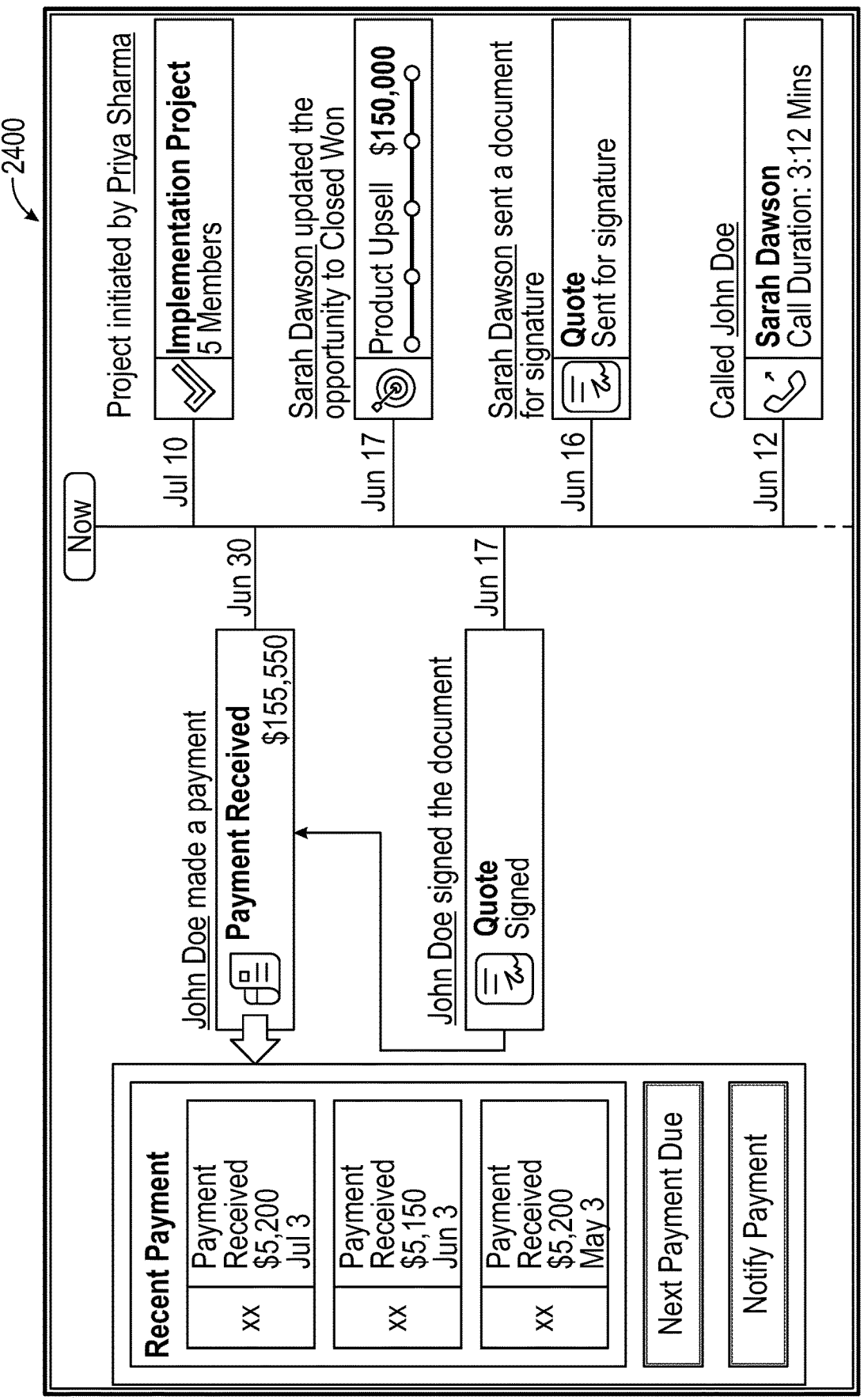
FIG. 24 illustrates an example of a popover for payment card in a timeline chart.

FIG. 24 illustrates an example of a popover for payment card in a timeline chart. The payment card has details of payments such as the date of payment and the amount of payment. In the example of FIG. 24, it is assumed the user is an account manager who is viewing her payment screen. The user is able to view payments made by John Doe, an employee of ZENN Inc. The popover shows additional information such as the number of payments received from the customer (ZENN Inc.), date of payment, the amount received in each payment and the third-part app used by the customer for payment. It also shows the upcoming payment date. The account manager can notify the customer of the next due date for payment.

Figure 25:
FIG. 25 depicts an example of a popover for expense card showing invoice submission in a timeline chart.

FIG. 25 depicts an example of a popover for expense card showing invoice submission in a timeline chart. In a scenario, the expenses incurred by a person in the sales team is submitted to the account manager for approval. For instance, Susan Lee is under sales team and reports to Sarah Dawson. Susan Lee submits an invoice for approval. The invoice is submitted through a popover from Susan Lee's card as shown in FIG. 25.

Figure 26:
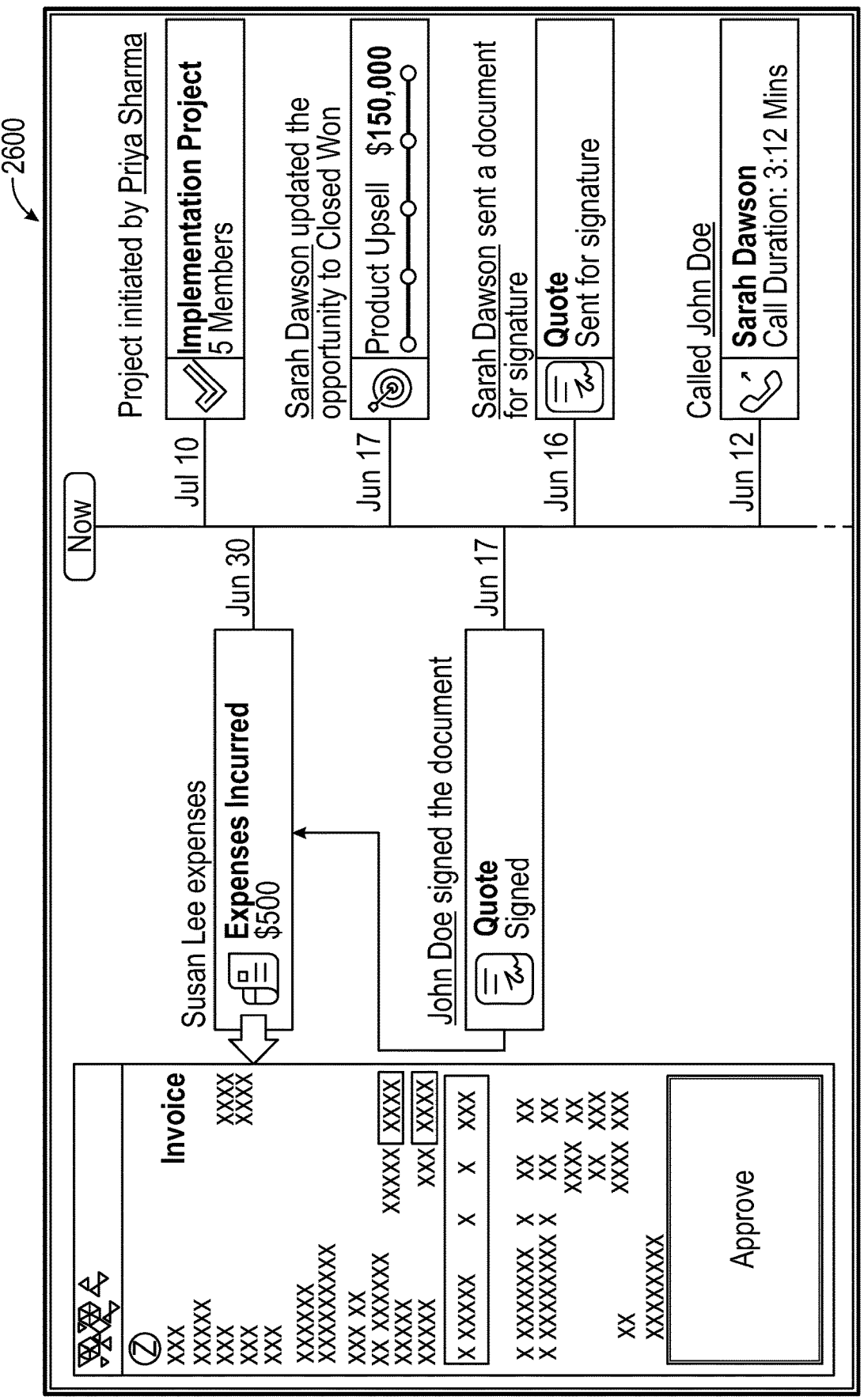
FIG. 26 depicts an example of a popover for expense card showing invoice approval in a timeline chart.

FIG. 26 depicts an example of a popover for expense card showing invoice approval in a timeline chart. The invoice approval is now displayed as shown in FIG. 26 in Sarah Dawson's timeline chart as a popover from an expenses incurred card. In a specific implementation, such invoice approvals are displayed only to people in the manager cadre, in accordance with the organizational chart. Once Sarah Dawson approves the invoice, the status of approval notification is sent or otherwise made available to Susan Lee.

Figure 27:
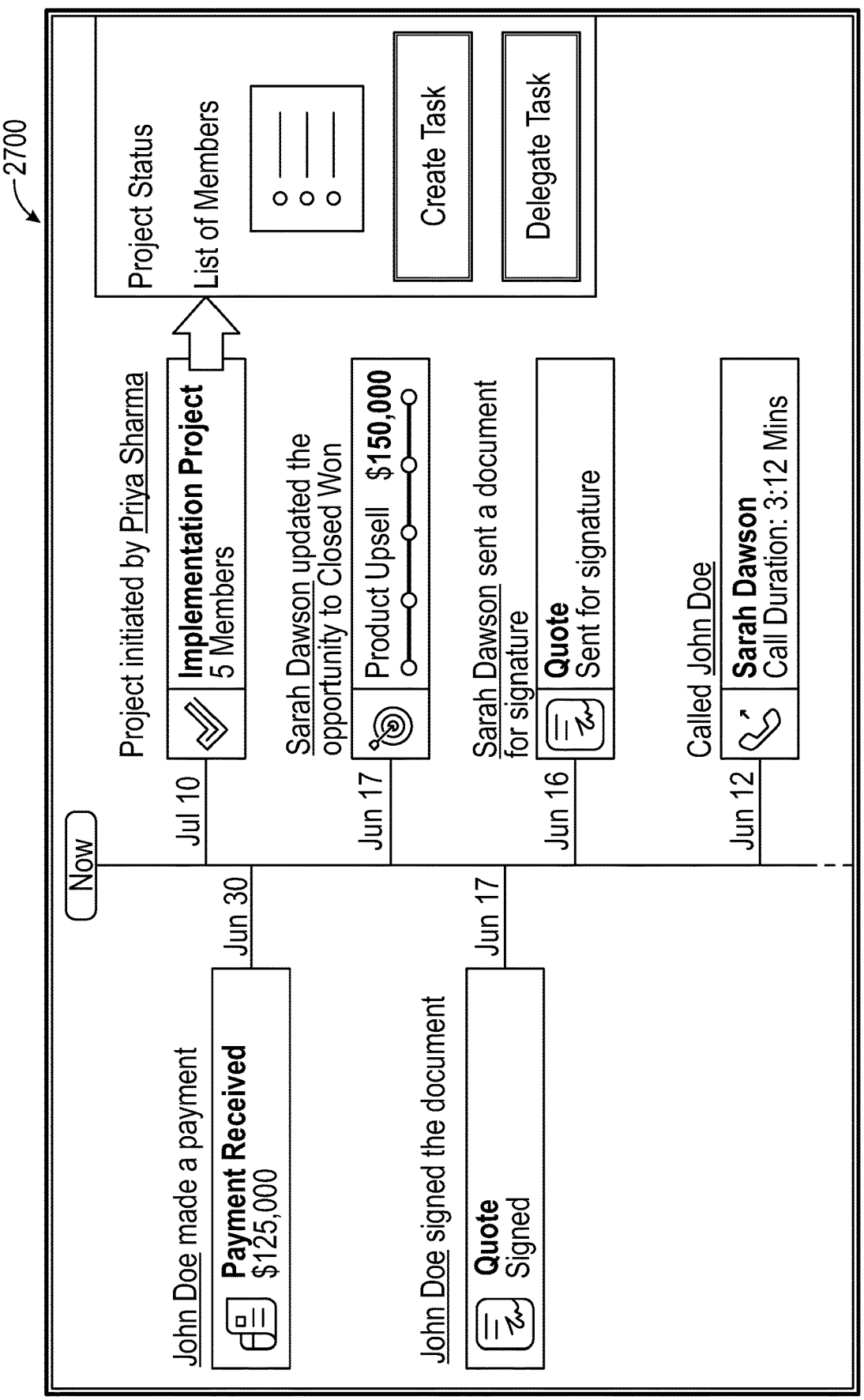
FIG. 27 depicts an example of a popover for projects card showing project delegation in a timeline chart.

FIG. 27 depicts an example of a popover for projects card showing project delegation in a timeline chart. An implementation project card displays the entity that initiated a project (e.g., a project manager) and the number of members involved in the project, as shown in FIG. 27. The content of a popover differs based on the profile of an employee entity. The content of a popover is determined based on context and access privilege of the user. For instance, if a project manager or project leader views the popover menu, it displays the status of the project completed in terms of percentage, the list of team members, options for creating and assigning task. In a specific implementation, the "Create Task" and "Delegate Task" options are available only to the project managers and project leaders, in accordance with the organizational chart; a team member can only view the status of project completion.

To speed up the project completion, the project manager (initiator) delegates the project leader to complete the task. The project leader can then create a task and assign it to one or more team members.

Figure 28:
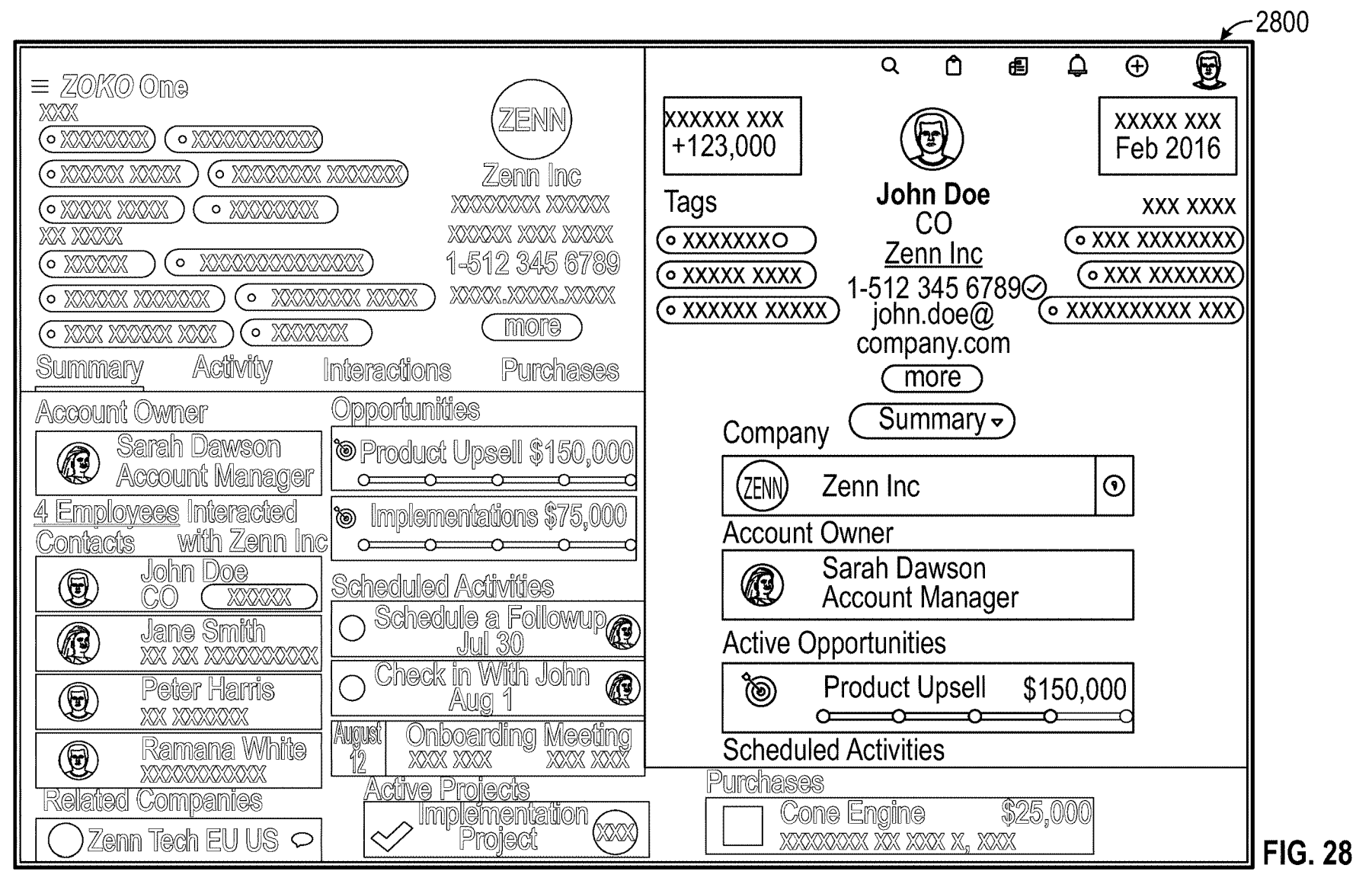

FIG. 28 depicts an example of a side bar rendered over an entity details screen. The upper right hand corner displays the profile picture of a user who has logged in. Upon hovering on the profile picture, a summary of the entity details screen is rendered in a side bar. The summary differs based on the navigation context and access permission of the user. In the example of FIG. 28, a side bar is rendered over the entity details screen of the entity Zenn Inc. The side bar renders cards with summary of information corresponding to the activity between the entity (Zenn Inc.) and the user.

Figure 29:
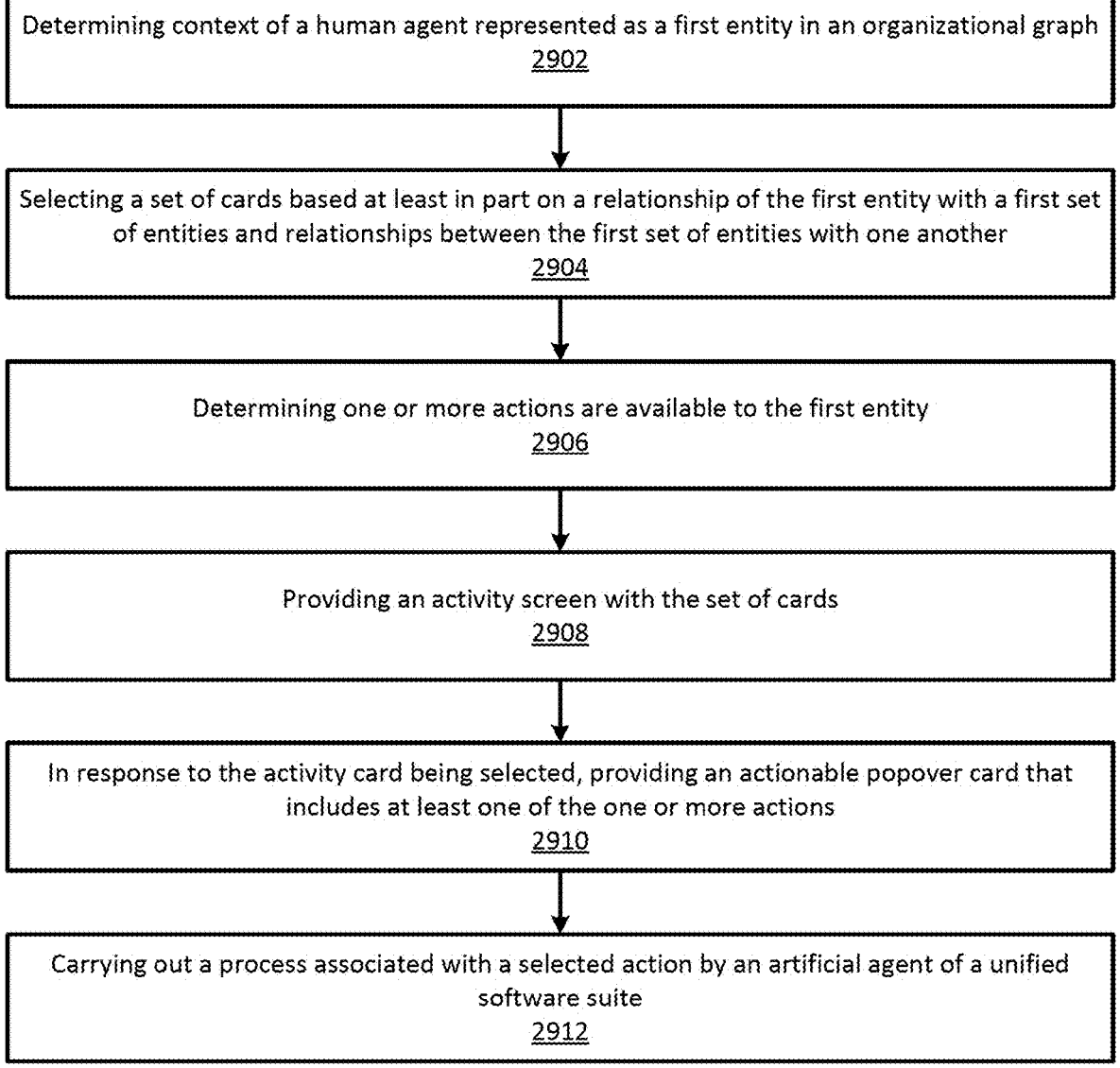
FIG. 29 is a flowchart of an example of a method for a human agent of an entity in an organizational graph taking actions in a unified software suite.

FIG. 29 is a flowchart 2900 of an example of a method for a human agent of an entity in an organizational graph taking actions in a unified software suite.

The flowchart 2900 starts at module 2902 with determining context of a human agent represented as a first entity in an organizational graph that includes a plurality of entities, including the first entity, at least conceptually as nodes connected to one another directly or indirectly via relationship edges. In a specific implementation, a contextualization engine determines the context of the human agent. The context of the human agent can be selected from a group of context variables consisting of a time zone attributed to the human agent, a geographical location attributed to the human agent, a navigation pattern attributed to the human agent, personalization parameters of the first entity, preferential parameters of the first entity, privacy associated with the second entity, and a combination of these. In a specific implementation, an access control engine determines access permissions of entities of the organizational graph. The relationship edges may include a permission selected from the group consisting of hierarchy level of the first entity within an organization utilizing the unified software suite, a time zone attributed to the human agent, a geographical location attributed to the human agent, privacy associated with the second entity, and a combination of these. In a specific implementation, the organization graph is maintained using a 3-tier architecture comprising a User Interface (UI) layer, a process layer, and a data layer.

The flowchart 2900 continues to module 2904 with selecting a set of cards for display in an activity screen based at least in part on a relationship of the first entity with a first set of entities of the plurality of entities and relationships between the first set of entities with one another, wherein cards of the set of cards are respectively associated with entities of the first set of entities.

The flowchart 2900 continues to module 2906 with determining one or more actions are available to the first entity in association with an activity card of the set of cards. In a specific implementation, the activity card is selected from a group of cards consisting of an email card, a chat card, an audio card, a video card, a meeting card, and a combination of these. In a specific implementation, the activity card includes a snapshot card. In a specific implementation, the activity card includes a live insight card. In a specific implementation, activity cards can be filtered using entity parameters. In a specific implementation, the activity card has a single-height activity card display option and a double-height activity card display option that causes the activity card to display more information in the double-height activity card when the double-height activity card display option is active than in the single-height activity card when the single-height activity card display option is active.

The flowchart 2900 continues to module 2908 with providing the activity screen with the set of cards, wherein at least one of the set of cards include an indication of at least one of the relationships between the first set of entities with one another and information about an activity of a second entity of the first set of entities. In a specific implementation, providing the design element to the activity screen includes mapping a data level identifier (ID) of a data item to a designated field on a design element template; generating a design element with a corresponding design level ID; mapping the design level ID of the design element to a UI level ID; and providing the design element with the UI level ID to the activity screen. In a specific implementation, the activity card is represented in a first timeline display element in chronological or reverse chronological order relative to other activity cards in the timeline display element. In a specific implementation, an activity trend line or bar graph associated with a first time span covering dates associated with a set of activity cards is presented along with a graphical element that can be selected or adjusted to display a subset of the set of activity cards corresponding to a second time span smaller than and within the first time span or an indication the subset is empty. In a specific implementation, date-lock functionality can be enabled to lock on an axis the activity card in a timeline with other cards in other timelines based on a date associated with the activity card and the other cards. In a specific implementation, a plurality of activity cards associated with an entity of the plurality of entities is provided as a stack of collapsible or expandable activity cards. In a specific implementation, information cards that illustrate entity behavior are provided.

In a specific implementation, the activity card is represented in a first swimlane display element in parallel with a plurality of activity cards for a respective plurality of entities in respective swimlane display elements. In a specific implementation, a middle swimlane includes interaction activity cards associated with activities between the second entity and a department-based entity, a first peripheral swimlane includes activity cards of the second entity, and a second peripheral swimlane includes activity cards of the department-based entity. The activity card(s) included or rendered in each swimlane correspond to a filter selected by the user, for each swimlane. The activity card(s) rendered in one swimlane corresponding to the selected filter, are not repeated or rendered again in another swimlane, eliminating the need to duplicate the unique card ID of the activity card. In a specific implementation, a statistical representation of frequency of activity in each lane of a plurality of swimlanes is provided.

The flowchart 2900 continues to module 2910 with, in response to a first input stimulus that serves to select the activity card, which can be characterized as the selected card when selected, providing an actionable popover card that includes a first action of the one or more actions as a selectable first graphical element of the one or more graphical elements. In a specific implementation, the actionable popover includes details of an activity instance associated with the activity card. In a specific implementation, the actionable popover is provided in association with filter options.

The flowchart 2900 ends at module 2912 with, in response to a second input stimulus that serves to select the first graphical element, carrying out a process, associated with the first action, that is executed by an artificial agent of a unified software suite, and that is either constrained by the relationship of the first entity with the second entity or constrained by the relationship of the first entity with a third entity associated with the action. In a specific implementation, the process includes retrieving, via a contextualization engine and an access control engine, data items from a data layer that are mapped to the activity card to provide the activity card a card identification (ID) and User Interface (UI) level ID that are unique to the first entity of the plurality of entities. In a specific implementation, the human agent experiences a uniform design regardless of whether the process is carried out by a first application or a second application of the unified software suite.

The invention claimed is:

1. A system comprising one or more processors and memory storing instructions that, when executed by the one or more processors, cause the system to perform:
   determining context of a human agent represented as a first entity in an organizational graph that includes a plurality of entities, including the first entity, at least conceptually as nodes connected to one another directly or indirectly via relationship edges;
   selecting a set of cards for display in an activity screen based at least in part on a relationship of the first entity with a first set of entities of the plurality of entities and relationships between the first set of entities with one another, wherein cards of the set of cards are respectively associated with entities of the first set of entities;
   determining one or more actions are available to the first entity in association with an activity card of the set of cards;
   providing the activity screen with the set of cards, wherein at least one card of the set of cards includes an indication of at least one of the relationships between the first set of entities with one another and information about an activity of a second entity of the first set of entities;
   in response to a first input stimulus that serves to select the activity card, which can be characterized as the selected card when selected, providing an actionable popover card that includes a first action of the one or more actions as a selectable first graphical element of the one or more graphical elements;
   in response to a second input stimulus that serves to select the first graphical element, carrying out a process, associated with the first action, that is executed by an artificial agent of a unified software suite, and that is either constrained by a relationship of the first entity with the second entity or constrained by a relationship of the first entity with a third entity associated with the action;
   in response to identifying a first swimlane associated with the first entity, a second swimlane associated with interaction between the first entity and the second entity, and a third swimlane associated with the second entity:
      representing the activity card in a first swimlane display element in parallel with a plurality of activity cards for a respective plurality of entities in respective swimlane display elements, wherein each respective swimlane display element comprises a respective different timeline chart; and
      wherein the first entity is one of a group of department-based entities, and wherein a middle swimlane includes interaction activity cards associated with activities between the second entity and at least one department-based entity of the group of department-based entities, a first peripheral swimlane includes activity cards of the second entity, and a second peripheral swimlane includes activity cards of the group of department-based entities.

2. The system of claim 1, wherein the context of the human agent is selected from a group of context variables consisting of a time zone attributed to the human agent, a geographical location attributed to the human agent, a navigation pattern attributed to the human agent, personalization parameters of the first entity, preferential parameters of the first entity, privacy associated with the second entity, and a combination of these.

3. The system of claim 1, wherein the relationship edges include a permission selected from the group consisting of a hierarchy level of the first entity within an organization utilizing the unified software suite, a time zone attributed to the human agent, a geographical location attributed to the human agent, privacy associated with the second entity, and a combination of these.

4. The system of claim 1, wherein the activity card is selected from a group of cards consisting of an email card, a chat card, an audio card, a video card, a meeting card, a task card, an event card, a project card, an information card, a feed card, a file card, a forum card, and a combination of these.

5. The system of claim 1, wherein the activity card includes a snapshot card.

6. The system of claim 1, wherein the activity card includes a live insight card.

7. The system of claim 1, wherein the organization graph is maintained using a 3-tier architecture comprising a User Interface (UI) layer, a process layer, and a data layer.

8. The system of claim 1, wherein the instructions cause the system to, as part of the process, perform retrieving data items from a data layer that are mapped to the activity card to provide the activity card a card identification (ID) and User Interface (UI) level ID that are unique to the first entity of the plurality of entities.

9. The system of claim 1, wherein the instructions cause the system to perform:

mapping a data level identifier (ID) of a data item to a designated field on a design element template;
generating a design element with a corresponding design level ID;
mapping the design level ID of the design element to a UI level ID;
providing the design element with the UI level ID to the activity screen.

10. The system of claim 1, wherein the instructions cause the system to perform representing the activity card in a first timeline display element in chronological or reverse chronological order relative to other activity cards in the timeline display element.

11. The system of claim 1, wherein the instructions cause the system to perform providing an activity trend line or bar graph associated with a first time span covering dates associated with a set of activity cards and a graphical element that can be selected or adjusted to display a subset of the set of activity cards corresponding to a second time span smaller than and within the first time span or an indication the subset is empty.

12. The system of claim 1, wherein the instructions cause the system to perform enabling date-lock functionality to lock on an axis the activity card in a timeline with other cards in other timelines based on a date associated with the activity card and the other cards.

13. The system of claim 1, wherein the instructions cause the system to perform providing a plurality of activity cards associated with an entity of the plurality of entities as a stack of collapsible or expandable activity cards.

14. The system of claim 1, wherein the activity cards can be filtered using entity parameters.

15. The system of claim 1, wherein the actionable popover includes details of an activity instance associated with the activity card.

16. The system of claim 1, wherein the actionable popover is provided in association with filter options.

17. The system of claim 1, wherein the activity card has a single-height activity card display option and a double-height activity card display option that causes the activity card to display more information in the double-height activity card when the double-height activity card display option is active than in the single-height activity card when the single-height activity card display option is active.

18. The system of claim 1, wherein the instructions cause the system to perform:
obtaining a first filter selection associated with the activity card;
including first activity cards, including the activity card, corresponding to the first filter selection in a first displayed swimlane, wherein the first displayed swimlane is one of all displayed swimlanes;
including second activity cards in second displayed swimlanes comprising all displayed swimlanes other than the first displayed swimlane, wherein the first activity cards and the second activity cards each have a unique card ID.

19. The system of claim 1, wherein the instructions cause the system to perform providing information cards that illustrate entity behavior.

20. The system of claim 1, wherein the instructions cause the system to perform providing a statistical representation of frequency of activity in each lane of a plurality of swimlanes.

21. A method comprising:
determining context of a human agent represented as a first entity in an organizational graph that includes a plurality of entities, including the first entity, at least conceptually as nodes connected to one another directly or indirectly via relationship edges;
selecting a set of cards for display in an activity screen based at least in part on a relations hip of the first entity with a first set of entities of the plurality of entities and relationships between the first set of entities with one another, wherein cards of the set of cards are respectively associated with entities of the first set of entities;
determining one or more actions are available to the first entity in association with an activity card of the set of cards;
providing the activity screen with the set of cards, wherein at least one card of the set of cards includes an indication of at least one of the relationships between the first set of entities with one another and information about an activity of a second entity of the first set of entities;
in response to a first input stimulus that serves to select the activity card, which can be characterized as the selected card when selected, providing an actionable popover card that includes a first action of the one or more actions as a selectable first graphical element of the one or more graphical elements;
in response to a second input stimulus that serves to select the first graphical element, carrying out a process, associated with the first action, that is executed by an artificial agent of a unified software suite, and that is either constrained by a relationship of the first entity with the second entity or constrained by a relationship of the first entity with a third entity associated with the action;
in response to identifying a first swimlane associated with the first entity, a second swimlane associated with interaction between the first entity and the second entity, and a third swimlane associated with the second entity:
representing the activity card in a first swimlane display element in parallel with a plurality of activity cards for a respective plurality of entities in respective swimlane display elements, wherein each respective swimlane display element comprises a respective different timeline chart; and
wherein the first entity is one of a group of department-based entities, and wherein a middle swimlane includes interaction activity cards associated with activities between the second entity and at least one department-based entity of the group of department-based entities, a first peripheral swimlane includes activity cards of the second entity, and a second peripheral swimlane includes activity cards of the group of department-based entities.

* * * * *